United States Patent
Sakane et al.

(10) Patent No.: US 8,066,910 B2
(45) Date of Patent: *Nov. 29, 2011

(54) PHOSPHOR AND MANUFACTURING METHOD FOR THE SAME, AND LIGHT SOURCE

(75) Inventors: Kenji Sakane, Tokyo (JP); Akira Nagatomi, Tokyo (JP); Masahiro Gotoh, Tokyo (JP); Shuji Yamashita, Tokyo (JP)

(73) Assignees: Dowa Electronics Materials Co., Ltd., Tokyo (JP); Nichia Corporation, Anan-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/662,472

(22) Filed: Apr. 19, 2010

(65) Prior Publication Data
US 2010/0301272 A1 Dec. 2, 2010

Related U.S. Application Data

(62) Division of application No. 12/285,295, filed on Oct. 1, 2008, now abandoned, which is a division of application No. 11/182,190, filed on Jul. 15, 2005, now Pat. No. 7,476,337.

(30) Foreign Application Priority Data

Jul. 28, 2004 (JP) .................................. 2004-220630
Jul. 15, 2005 (JP) .................................. 2005-207215

(51) Int. Cl.
*C09K 11/59* (2006.01)
*H01L 33/00* (2010.01)

(52) U.S. Cl. .................................. 252/301.4 F; 313/486
(58) Field of Classification Search .............. 252/301.4 F
See application file for complete search history.

(56) References Cited

U.S. PATENT DOCUMENTS

| 18,985 | A | 12/1857 | Olds |
| 2,121,275 | A | 6/1938 | Zober et al. |
| 3,527,595 | A | 9/1970 | Adler et al. |
| 3,697,301 | A | 10/1972 | Donofrio et al. |

(Continued)

FOREIGN PATENT DOCUMENTS

EP  0 459 156 A2  4/1991

(Continued)

OTHER PUBLICATIONS

Uheda et al, "The Crystal Structure and Photoluminescence Propeties of a New Red Phosphor, Calcium Aluminum Silicon Nitride doped with Divalent Europium", Abs. 2073, 206th Meeting, 2004.*

(Continued)

*Primary Examiner* — Carol M Koslow
(74) *Attorney, Agent, or Firm* — Foley & Lardner LLP

(57) ABSTRACT

To provide a phosphor having an emission characteristic such that a peak wavelength of light emission is in a range from 580 to 680 nm, and having a high emission intensity, and having a flat excitation band with high efficiency for excitation light in a broad wavelength range from ultraviolet to visible light (wavelength range from 250 nm to 550 nm). For example, $Ca_3N_2(2N)$, $AlN(3N)$, $Si_3N_4(3N)$, $Eu_2O_3(3N)$ are prepared, and after weighing and mixing a predetermined amount of each raw material, raw materials are fired at 1500° C. for 6 hours, thus obtaining the phosphor including a product phase expressed by a composition formula $CaAlSiN_3$:Eu and having an X-ray diffraction pattern satisfying a predetermined pattern.

7 Claims, 11 Drawing Sheets

U.S. PATENT DOCUMENTS

| | | | |
|---|---|---|---|
| 4,477,689 A | 10/1984 | Ogasahara et al. | |
| 4,576,736 A | 3/1986 | Harmuth | |
| 4,716,335 A | 12/1987 | Schutten et al. | |
| 5,398,398 A | 3/1995 | Williams et al. | |
| 5,447,291 A | 9/1995 | Sandhage | |
| 5,600,202 A | 2/1997 | Yamada et al. | |
| 6,180,029 B1 | 1/2001 | Hampden-Smith et al. | |
| 6,504,297 B1 | 1/2003 | Heo et al. | |
| 6,670,748 B2 | 12/2003 | Ellens et al. | |
| 7,138,756 B2 * | 11/2006 | Gotoh et al. | 313/467 |
| 7,252,788 B2 * | 8/2007 | Nagatomi et al. | 252/301.4 F |
| 7,273,568 B2 * | 9/2007 | Nagatomi et al. | 252/301.4 F |
| 7,345,418 B2 | 3/2008 | Nagatomi et al. | |
| 7,432,647 B2 | 10/2008 | Nagatomi et al. | |
| 7,470,378 B2 | 12/2008 | Hirosaki | |
| 7,476,337 B2 | 1/2009 | Sakane et al. | |
| 7,477,009 B2 * | 1/2009 | Nagatomi et al. | 313/487 |
| 7,507,354 B2 | 3/2009 | Oshio | |
| 7,514,860 B2 | 4/2009 | Nagatomi et al. | |
| 7,517,748 B2 | 4/2009 | Williams et al. | |
| 7,537,710 B2 | 5/2009 | Oshio | |
| 2002/0043926 A1 | 4/2002 | Takahashi et al. | |
| 2003/0030038 A1 | 2/2003 | Mitomo et al. | |
| 2003/0030368 A1 | 2/2003 | Ellens et al. | |
| 2003/0094893 A1 | 5/2003 | Ellens et al. | |
| 2003/0132422 A1 | 7/2003 | Tian et al. | |
| 2003/0152804 A1 | 8/2003 | Miura et al. | |
| 2003/0213611 A1 | 11/2003 | Morita | |
| 2004/0155225 A1 | 8/2004 | Yamada et al. | |
| 2004/0263074 A1 | 12/2004 | Baroky et al. | |
| 2005/0001225 A1 | 1/2005 | Yoshimura et al. | |
| 2005/0189863 A1 | 9/2005 | Nagatomi et al. | |
| 2005/0203845 A1 | 9/2005 | Yoshimine et al. | |
| 2005/0205845 A1 | 9/2005 | Deising et al. | |
| 2005/0253500 A1 | 11/2005 | Gotoh et al. | |
| 2005/0267243 A1 | 12/2005 | Amasaki et al. | |
| 2006/0006782 A1 | 1/2006 | Nagatomi et al. | |
| 2006/0017365 A1 | 1/2006 | Nagatomi et al. | |
| 2006/0021788 A1 | 2/2006 | Kohayashi et al. | |
| 2006/0022573 A1 | 2/2006 | Gotoh et al. | |
| 2006/0033083 A1 | 2/2006 | Sakane et al. | |
| 2006/0043337 A1 | 3/2006 | Sakane et al. | |
| 2006/0045832 A1 | 3/2006 | Nagatomi et al. | |
| 2006/0065878 A1 | 3/2006 | Sakane et al. | |
| 2006/0076883 A1 | 4/2006 | Himaki et al. | |
| 2006/0091790 A1 | 5/2006 | Nagatomi et al. | |
| 2006/0170332 A1 | 8/2006 | Tamaki et al. | |
| 2006/0197432 A1 | 9/2006 | Nagatomi et al. | |
| 2006/0197439 A1 | 9/2006 | Sakane et al. | |
| 2006/0220047 A1 | 10/2006 | Nagatomi et al. | |
| 2006/0220520 A1 | 10/2006 | Sakane et al. | |
| 2006/0244356 A1 | 11/2006 | Nagatomi et al. | |
| 2007/0007494 A1 * | 1/2007 | Hirosaki et al. | 252/301.4 R |
| 2007/0029525 A1 | 2/2007 | Gotoh et al. | |
| 2007/0164308 A1 | 7/2007 | Yoshimura et al. | |

FOREIGN PATENT DOCUMENTS

| | | |
|---|---|---|
| EP | 1 104 799 A1 | 6/2001 |
| EP | 1 278 250 A2 | 1/2003 |
| EP | 1 296 376 A2 | 3/2003 |
| EP | 1 296 383 A2 | 3/2003 |
| EP | 1 445 295 A1 | 8/2004 |
| JP | A-05-015655 | 1/1993 |
| JP | A-05-198433 | 8/1993 |
| JP | A-11-144938 | 5/1999 |
| JP | A-11-277527 | 10/1999 |
| JP | A-2000-073053 | 3/2000 |
| JP | A-2000-153167 | 6/2000 |
| JP | A-2001-214162 | 8/2001 |
| JP | A-2002-363554 | 12/2002 |
| JP | A-2003-013059 | 1/2003 |
| JP | A-2003-096446 | 4/2003 |
| JP | A-2003-124527 | 4/2003 |
| JP | A-2003-515655 | 5/2003 |
| JP | A-2003-277746 | 10/2003 |
| JP | A-2003-336059 | 11/2003 |
| JP | A-2004-055536 | 2/2004 |
| JP | A-2004-055910 | 2/2004 |
| JP | A-2004-505470 | 2/2004 |
| JP | A-2004-067837 | 3/2004 |
| JP | A-2004-145718 | 5/2004 |
| JP | A-2004-186278 | 7/2004 |
| JP | A-2004-189997 | 7/2004 |
| JP | A-2004-235598 | 8/2004 |
| JP | A-2004-244560 | 9/2004 |
| JP | A-2005-344025 | 12/2005 |
| JP | A-2006-028295 | 2/2006 |
| JP | A-2006-036214 | 3/2006 |
| JP | A-2006-063286 | 3/2006 |
| JP | A-2006-070109 | 3/2006 |
| JP | A-2006-176546 | 7/2006 |
| JP | A-2006-282809 | 10/2006 |
| JP | A-2006-282872 | 10/2006 |
| WO | WO 01/40403 A1 | 6/2001 |
| WO | WO 02/11214 A1 | 2/2002 |
| WO | WO 2004/030109 A1 | 4/2004 |
| WO | WO 2004/039915 A1 | 5/2004 |
| WO | WO 2004/055910 A1 | 7/2004 |
| WO | WO 2005/033247 | 4/2005 |
| WO | WO 2005/049763 | 6/2005 |
| WO | WO 2005/052087 * | 6/2005 |
| WO | WO 2005/052087 A1 | 6/2005 |
| WO | WO 2006/093298 A1 | 9/2006 |

OTHER PUBLICATIONS

"Phosphor Handbook;" (compiled by Phosphor Research Society, published by Ohmusha, Ltd., 1987); pp. 172-176.
Jis Z 8726; "Method of Specifying Colour Rendering Properties of Light Sources;" (1990), pp. 381-390.
U.S. Appl. No. 11/194,590, filed Aug. 2, 2005.
K. Uheda et al., "The Crystal Structure and Photoluminescence Properties of a New Red Phosphor, Calcium Aluminum Silicon Nitride Doped With Divalent Europium," Abs. 2073, 206$^{th}$ Meeting., Oct. 3, 2004.
U.S. Appl. No. 10/984,772, filed Nov. 10, 2004, Akira Nagatomi et al.
U.S. Appl. No. 11/061,669, filed Feb. 22, 2005, Akira Nagatomi et al.
U.S. Appl. No. 11/063,847, filed Feb. 23, 2005, Kenji Sakane et al.
U.S. Appl. No. 11/149,317, filed Jun. 10, 2005, Akira Nagatomi et al.
U.S. Appl. No. 11/149,192, filed Jun. 10, 2005, Kenji Sakane et al.
U.S. Appl. No. 11/198,281, filed Aug. 8, 2005, Akira Nagatomi et al.
U.S. Appl. No. 11/194,590, filed Aug. 2, 2005, Masahiro Gotoh et al.
U.S. Appl. No. 11/211,751, filed Aug. 26, 2005, Kenji Sakane et al.
U.S. Appl. No. 11/218,504, filed Sep. 6, 2005, Akira Nagatomi et al.
Aug. 2, 2010 Supplementary Partial European Search Report issued in European Application No. 05767226.3.
JP-2004-166058, filed Jun. 2004 in Japan.
JP-2004-20721, filed Jul. 2004 in Japan.
JP-2004-248405, filed Aug. 2004 in Japan.
JP-2004-250920, filed Aug. 2004 in Japan.
JP-2004-253312, filed Aug. 2004 in Japan.
JP-2004-368153, filed Dec. 2004 in Japan.
JP-2005-075854, filed Mar. 2005 in Japan.
JP-2005-103429, filed Mar. 2005 in Japan.
JP-2005-105126, filed Mar. 2005 in Japan.
JP-2005-192691, filed Jun. 2005 in Japan.

* cited by examiner

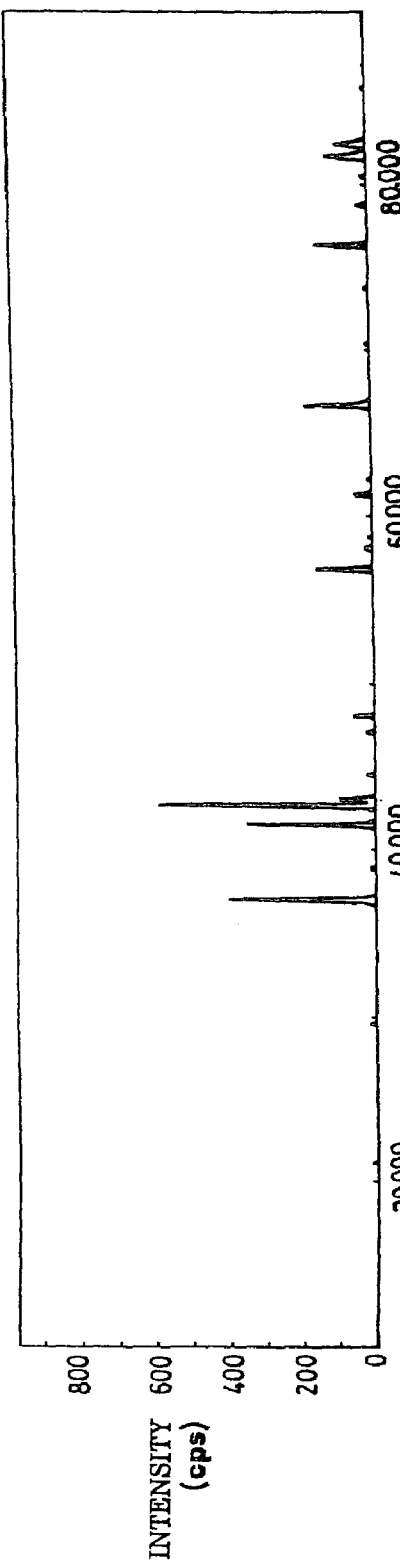
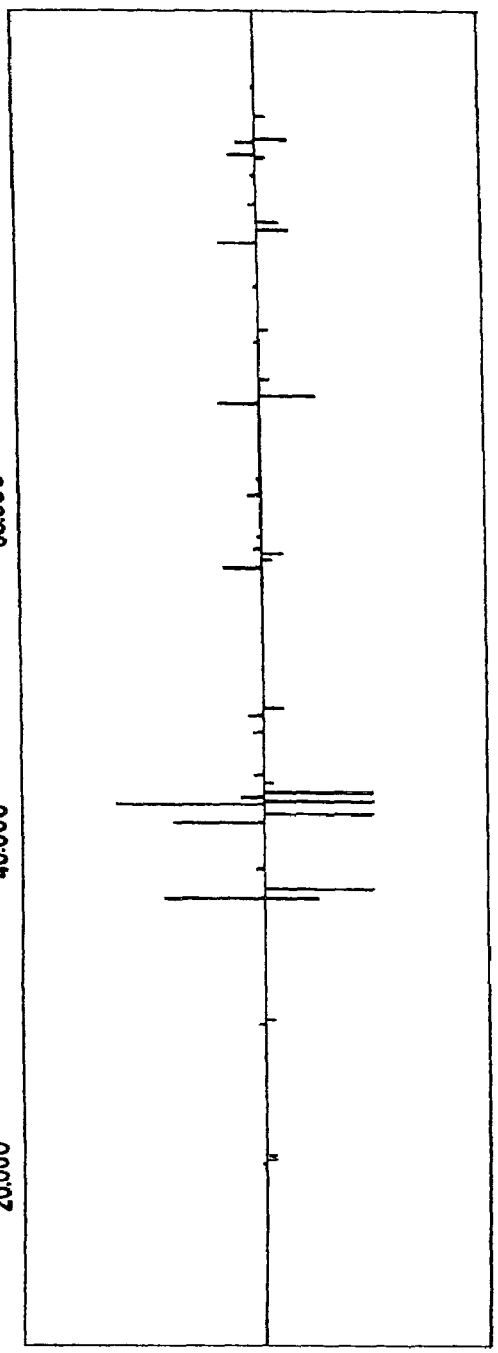
FIG. 1A
FIG. 1B

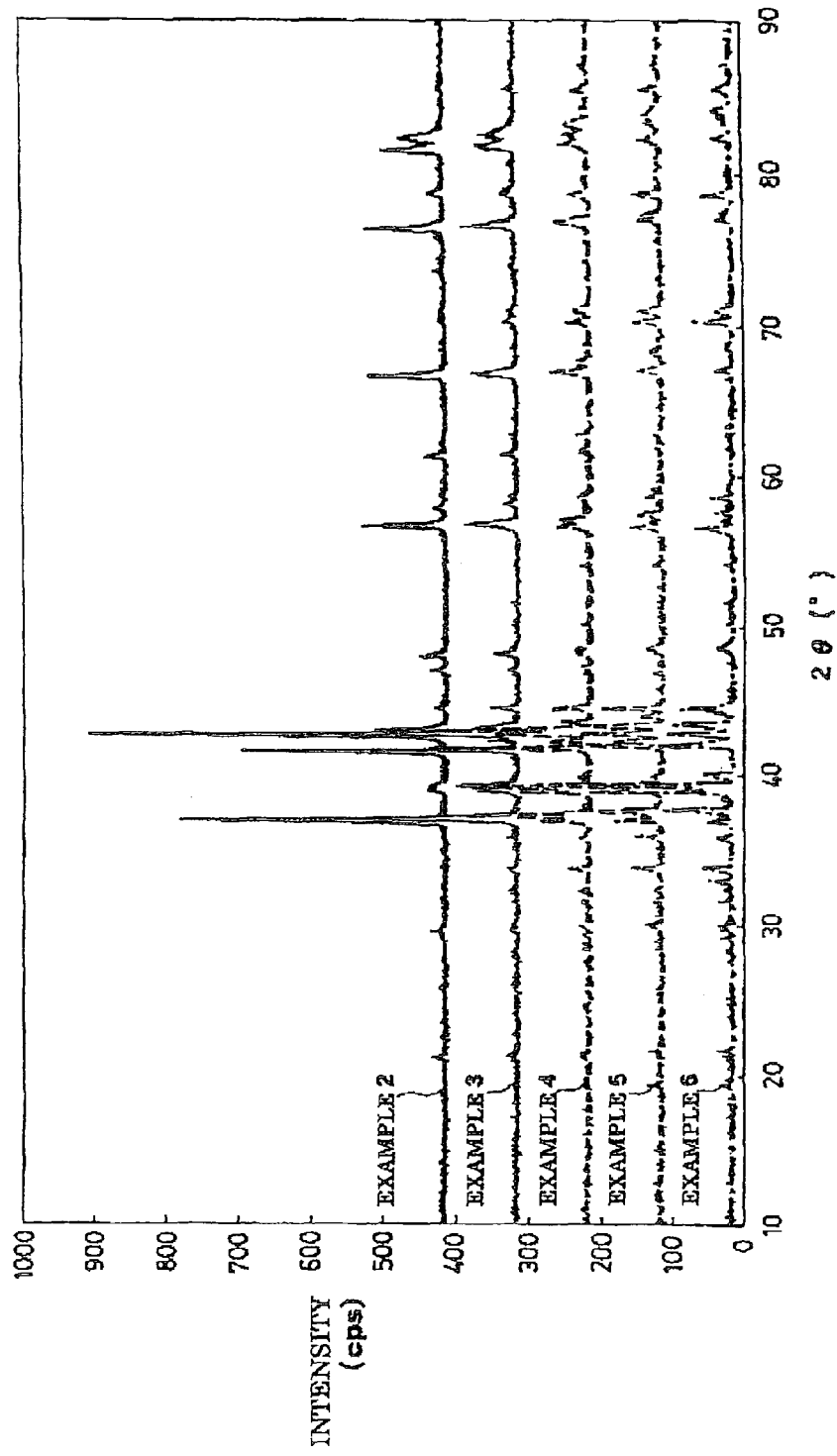

PHOSPHOR AND MANUFACTURING METHOD FOR THE SAME, AND LIGHT SOURCE

This is a Divisional of application Ser. No. 12/285,295 filed Oct. 1, 2008, now abandoned, which is a Divisional of application Ser. No. 11/182,190 filed Jul. 15, 2005, now U.S. Pat. No. 7,476,337, which claims priority to JP 2004-220630 filed Jul. 28, 2004 and JP 2005-207215 filed Jul. 15, 2005. The entire disclosures of the prior applications are hereby incorporated by reference herein.

TECHNICAL FIELD OF THE INVENTION

The present invention relates to a phosphor used in a display device such as a cathode-ray tube (CRT), a plasma display (PDP), a field emission display (FED), electroluminescence (EL) display, a fluorescent display tube, and an illumination device such as a fluorescent lamp, and a manufacturing method of the same, and a light source using the phosphor.

BACKGROUND ART

At present, a discharge type fluorescent lamp and an incandescent bulb used as the illumination device involve problems that a harmful substance such as mercury is contained, and life span is short. However, in recent years, a high luminescence LED emitting light of near ultraviolet/ultraviolet to blue color has been developed in sequence, and the white LED illumination for the practical application of the next generation has been actively studied and developed, by combining the light of ultraviolet to blue color generated from the LED, and a phosphor having an excitation band in a range from ultraviolet to blue color. When the white LED illumination is put to practical use, since efficiency of converting electric energy into light is improved, less heat is generated and it is constituted of a semiconductor device and the phosphor, the white LED has advantages of good life span without burn-out of a filament as is seen in a conventional incandescent bulb, being strong against vibration and repeated on/off operation, and having no harmful substance such as mercury contained therein, thus realizing an ideal illumination device. Further, by utilizing the aforementioned characteristic, the aforementioned white LED is noted as a backlight for a liquid crystal display which replaces a CCFL (cold-cathode tube) other than as illumination.

Here, in order to obtain a white light by combining the aforementioned LED and the phosphor, generally two systems are considered. In one of such systems, white light emission is obtained by combining a blue light emitting LED and a yellow light emitting phosphor (such as YAG:Ce) which emits yellow color by receiving and excited by the blue light emission, and by a principle of mixed state of lights of blue light emission and yellow light emission.

In another system, the white light emission is obtained, by combining a near ultraviolet/ultraviolet light emitting LED, a red (R) light emitting phosphor by receiving and excited by the near ultraviolet/ultraviolet light emission, a green (G) light emitting phosphor, a blue (B) light emitting phosphor, and others, and using a mixed state of the lights of the R, G, B and others emitted from the phosphor. A method of obtaining the white light emission by the lights of the R, G, B and others has wide applications, because an arbitrary light emission color other than the white light can be obtained depending on a combination and a mixing ratio of each phosphor of the R, G, B and others. As the phosphors used in the aforementioned usage, examples are given such as $Y_2O_2S$:Eu, $La_2O_2S$:Eu, $3.5MgO.0.5MgF_2.GeO_2$:Mn, $(La, Mn, Sm)_2O_2S.Ga_2O_3$:Eu as the red phosphor, ZnS:Cu, Al, $SrAl_2O_4$:Eu, BAM:Eu, Mn as the green phosphor, and BAM:Eu, $Sr_5(PO_4)_3Cl$:Eu, ZnS: Ag, Cl, $(Sr, Ca, Ba, mg)_{10}(PO_4)_6Cl$:Eu as the blue phosphor. Then, by combining the phosphors of the R, G, B, and others with a light emitting part such as the near ultraviolet/ultraviolet light emitting LED, a light source and an illumination device such as an LED emitting white light or the light with desired emission color can be obtained.

However, in the white LED illumination obtained by combining the blue LED and the yellow phosphor (YAG:Ce), the light emission on the longer wavelength side of a visible light becomes insufficient, thus emitting the light with slightly bluish white emission color, and the white light emission with slightly reddish white color like an electric bulb can not be obtained.

In addition, in the white LED illumination obtained by combining the near ultraviolet/ultraviolet LED and the phosphor of R, G, B, and others, the red phosphor out of three color phosphors has a deteriorated excitation efficiency, thereby exhibiting low emission efficiency, compared to other phosphors. Therefore, the mixing ratio of only red phosphor must be increased and the phosphor for improving luminance becomes thereby insufficient, making it impossible to obtain white color with high luminance. Further, a problem involved therein is that the aforementioned red phosphor has a sharp emission spectrum, thereby exhibiting deteriorated color rendering property.

Further, from the viewpoint of improving the emission efficiency of the light emitting element and the phosphor, in the case of the aforementioned YAG:Ce yellow phosphor, the YAG:Ce yellow phosphor is in an excitation range with high efficiency when it is caused to emit light by using blue light emitted from the blue LED, whereby an excellent yellow light emission can be obtained. However, when it is caused to emit light by using the near ultraviolet/ultraviolet light emitted from the near ultraviolet/ultraviolet LED, the YAG:Ce yellow phosphor is out of the excitation range with high efficiency, and therefore an adequate light emission can not be obtained. This means that the excitation range with high efficiency is narrow for the YAG:Ce yellow phosphor.

Then, the problem that the excitation range with high efficiency is narrow for the YAG:Ce yellow phosphor involves a situation such that a wavelength balance of blue color and yellow color is lost, because the emission wavelength of the blue LED is out of an optimal excitation range of the YAG:Ce yellow phosphor by the deviation of an emission wavelength caused by the deviation of the light emitting elements during manufacturing the blue LED even in a case of light emission by using the blue light emitted from the aforementioned blue LED. When the aforementioned situation occurs, the problem involved therein is that a color tone of the white light which is obtained by synthesizing the blue light and the yellow light is changed. Here, in manufacturing the LED, it is difficult to prevent the deviation of the light emitting elements in the present circumstances. Therefore, in order to prevent the change of the color tone, the phosphor having characteristics of a broad and flat excitation band is desired.

Therefore, recently, an oxynitride glass phosphor having an excellent excitation band on the longer wavelength side and capable of obtaining an emission peak with a broad half value width (for example, see patent document 1), and a sialon-based phosphor (for example see patent documents 2 and 3), and a silicon nitride-based phosphor containing nitrogen (for example, see patent documents 4 and 5) are reported. Then, the phosphor containing the nitrogen has a larger ratio of covalent bond than an oxide phosphor, and therefore has an excellent excitation band in the light with the wavelength of 400 nm or more, gathering attention as a white LED phosphor. However, such a phosphor fails in reaching a satisfactory level in the present circumstances.

(Patent document 1) Japanese Patent Laid Open No. 2001-214162
(Patent document 2) Japanese Patent Laid Open No. 2003-336059
(Patent document 3) Japanese Patent Laid Open No. 2003-124527
(Patent document 4) Japanese Patent Laid Open No. 2003-515655
(Patent document 5) Japanese Patent Laid Open No. 2003-277746

SUMMARY OF THE INVENTION

In view of the above-described circumstances, the present invention is provided, and an object of the present invention is to provide a phosphor having an emission characteristic of having an emission spectrum with a peak in a wavelength range from 580 to 680 nm with a high emission intensity, and an excitation band characteristic of having a flat excitation band with high efficiency for excitation light in a broad wavelength range from ultraviolet to visible light (wavelength range from 250 to 550 nm) and a manufacturing method of the same, and a light source using the phosphor.

In order to solve the aforementioned problem, the inventors of the present invention prepares a plurality of phosphor samples. Then, in a process of firing a raw material of the phosphor sample, the phosphor sample according to the present invention satisfying the aforementioned emission characteristic and excitation band characteristic is found from fired phosphor samples, with an atmosphere gas ventilated in a firing furnace during firing. Then, a crystal structure of the phosphor according to the present invention is identified by using an X-ray diffraction method. Specifically, the X-ray diffraction pattern of the phosphor according to the present invention and a JCPDS (Joint Committee on Power Diffraction Standards) card are compared, and the crystal structure of the phosphor according to the present invention is identified. As a result, a known crystal structure is found which is considered to be similar to the phosphor according to the present invention. However, the crystal structure having an identical crystal face interval is not found. Therefore, it is found that the phosphor according to the present invention has a new crystal structure. Then, the inventors of the preset invention define the phosphor according to the present invention, with the X-ray diffraction pattern shown by the phosphor according to the present invention. (the X-ray diffraction pattern in the present invention is used in the same meaning as an X-ray diffraction spectrum and an X-ray diffraction chart.)

Specifically, the present invention takes several aspects as follows.

In a first aspect, a phosphor is provided, comprising a phase showing a diffraction peak with relative intensity of 10% or more in the Bragg angle (2θ) range from 36.5° to 37.5° and from 41.9° to 42.9° of the X-ray diffraction pattern as a main product phase, when the relative intensity of the diffraction peak having a highest intensity in a powder X-ray diffraction pattern by CoKα ray is defined as 100%.

In a second aspect, a phosphor is provided, comprising a phase showing a diffraction peak with relative intensity of 10% or more in the Bragg angle (2θ) range from 36.5° to 37.5° and from 41.9° to 42.9°, and from 56.3° to 57.3° of the X-ray diffraction pattern, when the relative intensity of the diffraction peak having a highest intensity in a powder X-ray diffraction pattern by CoKα ray is defined as 100%.

In a third aspect, a phosphor is provided, comprising a phase showing a diffraction peak with relative intensity of 10% or more in the Bragg angle (2θ) range from 36.5° to 37.5° and from 40.9° to 41.9°, 41.9° to 42.9°, 56.3° to 57.3°, 66.0° to 67.0°, 75.8° to 76.8°, and 81.0° to 83.0° of the X-ray diffraction pattern, when the relative intensity of the diffraction peak having a highest intensity in a powder X-ray diffraction pattern by CoKα ray is defined as 100%.

In a fourth aspect, the phosphor according to any one of the first to third aspects is provided, wherein a crystal system of the product phase is an orthorhombic system.

In a fifth aspect, the phosphor according to any one of the first to fourth aspects is provided, wherein the product phase is expressed by a composition formula $M_mA_aD_bO_oN_n$:Z, where element M is at least one or more kind of element having bivalent valency, element A is at least one or more kind of element having tervalent valency, element D is at least one or more kind of element selected from the elements having tetravalent valency, O is oxygen, N is nitrogen, and element Z is at least one or more kind of element selected from rare earth elements or transitional metal elements, satisfying n=2/3 m+a+4/3b−2/3o, m/(a+b) 1/2, (o+n)/(a+b)>4/3, o≧0, and m:a:b=1:1:1.

In a sixth aspect, the phosphor according to any one of the first to fourth aspects is provided, wherein the product phase is expressed by a composition formula $M_mA_aD_bN_n$:Z, where element M is at least one or more kind of element having bivalent valency, element A is at least one or more kind of element having tervalent valency, element D is at least one or more kind of element selected from the elements having tetravalent valency, N is nitrogen, and element Z is at least one or more kind of element selected from rare earth elements or transitional metal elements, satisfying m:a:b:n=1:1:1:3.

In a seventh aspect, the phosphor according to either of the fifth aspect or the sixth aspect is provided, wherein the element M is at least one or more kind of element selected from the group consisting of Mg, Ca, Sr, Ba, and Zn, and the element A is Al, the element D is Si, and the element Z is at least one or more kind of element selected from Eu, Mn, and Ce.

In an eighth aspect, the phosphor according to any one of the fifth to seventh aspects is provided, wherein the element M is Ca, the element A is Al, the element D is Si, and the element Z is Eu.

In a ninth aspect, the phosphor according to any one of the first to eighth aspects is provided, wherein no diffraction peak with relative intensity of beyond 5% exists in the Bragg angle (2θ) range from 38.0° to 40.0° of the X-ray diffraction pattern, when the powder X-ray diffraction pattern of the phosphor by CoKα ray is measured, and the relative intensity of the diffraction peak with highest intensity in the X-ray diffraction pattern is defined as 100%.

In a tenth aspect, the phosphor according to any one of the fifth to ninth aspects is provided, wherein a wavelength of a maximum peak in an emission spectrum is 650 nm or more, when the phosphor is irradiated with more than one kind of monochromatic lights in a wavelength range from 250 nm to 550 nm or continuous light including this wavelength range as an excitation light.

In an eleventh aspect, the phosphor according to any one of the fifth to tenth aspects is provided, wherein the size (Dx) of a crystallite of the phosphor particle is 50 nm or more.

In a twelfth aspect, the phosphor according to any one of the fifth to eleventh aspects is provided, wherein a unit volume of a crystal lattice of the product phase included in the phosphor is 275 Å$^3$ or more.

In a thirteenth aspect, the phosphor according to any one of the fifth to twelfth aspects is provided, wherein a lattice constant of the crystal lattice of the product phase included in the phosphor is a=9.75 Å or more, b=5.64 Å or more, and c=5.05 Å or more.

In a fourteenth aspect, a manufacturing method of the phosphor according to any one of the first to thirteenth aspects is provided, comprising the steps of:

obtaining a mixture by weighing and mixing raw material powders of the phosphor;

obtaining a fired material by firing the mixture in a firing furnace; and obtaining the phosphor by pulverizing the fired material, wherein in the step of obtaining the fired material by firing the mixture, any one of the gases such as nitrogen, ammonia, mixed gas of the ammonia and the nitrogen, or mixed gas of the nitrogen and hydrogen is used as an atmosphere gas during firing.

In a fifteenth aspect, the manufacturing method of the phosphor according to the fourteenth aspect is provided, wherein the gas containing 80% or more of nitrogen gas is used as the atmosphere gas in the firing furnace during firing.

In a sixteenth aspect, the manufacturing method of the phosphor according to either of the fourteenth or fifteenth aspect is provided, wherein in the step of obtaining the fired material by firing the mixture in the firing furnace, the mixture is fired, while 0.01 L/min or more of atmosphere gas is ventilated in the firing furnace during firing.

In a seventeenth aspect, the manufacturing method of the phosphor according to any one of the fourteenth to sixteenth aspects is provided, wherein in the step of obtaining the fired material by firing the mixture in the firing furnace, the pressure of atmosphere gas is set at 0.001 MPa or more and 0.1 MPa or less to make the inside the firing furnace in a pressurized state.

In an eighteenth aspect, a light source is provided, using the phosphor according to any one of the first to thirteenth aspects.

The phosphor according to the first to thirteenth aspects of the present invention has the excellent emission characteristic of having the emission spectrum with a peak in the wavelength range from 580 to 680 nm and particularly having a high emission intensity with a peak in the longer wavelength side, e.g. at 650 nm or more, and further has the excitation band characteristic of having a flat excitation band with high efficiency in a broad wavelength range from ultraviolet to visible light (wavelength range from 250 to 550 nm).

According to the manufacturing method of the phosphor described in any one of the fourteenth to seventeenth aspects, the oxygen in the phosphor composition described in any one of the first to thirteenth aspects is reduced, and the phosphor having an emission spectrum with a peak on the longer wavelength side and having an improved emission efficiency can be easily manufactured at an inexpensive manufacturing cost.

According to a light emission apparatus described in the eighteenth aspect, the light emission apparatus having a desired emission color, having a high emission intensity and luminance, and having high efficiency can be obtained.

BRIEF DESCRIPTION OF THE DRAWINGS

FIG. 1 is a powder X-ray diffraction pattern of a main product phase of a phosphor according to the present invention, and the comparison of peaks between the measured X-ray diffraction pattern and a JCPDS card.

FIG. 4A is a powder X-ray diffraction pattern of the main product phase of the phosphor according to the examples 2 to 4 of the present invention.

BEST MODE FOR CARRYING OUT THE INVENTION

Figure 2:
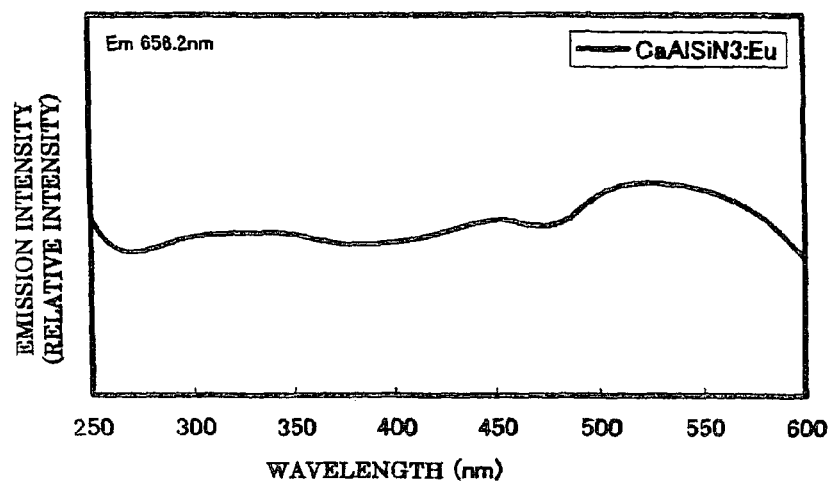
FIG. 2 is a graph showing an excitation spectrum of the main product phase of the phosphor according to the present invention.

The phosphor according to the present invention provides the phosphor including a product phase expressed by a composition formula such as $M_mA_aD_bO_oN_n$:Z (in some cases, simply described as "product phase" hereunder.). Here, element M is at least one or more kind of element selected from the elements having bivalent valency in a main product phase of the phosphor, element A is at least one or more kind of element having tervalent valency in the product phase, element D is at least one or more kind of element having tetravalent valency in the product phase, O is oxygen, N is nitrogen, and element Z is the element acting as the activator in the product phase and is one or more kind of element selected from rare earth elements or transitional metal elements. When the product phase has a crystal structure defined by an X-ray diffraction pattern as will be described later, the product phase exhibits an excellent emission characteristic having the emission spectrum with a peak in a wavelength range from 580 to 680 nm and having a high emission intensity, and further exhibits an excitation band characteristic having a flat excitation band with high efficiency in a broad wavelength range from ultraviolet to visible light (wavelength range from 250 to 550 nm).

Further, when the product phase has a chemically stable composition, an impurity phase not contributing to light emission is hardly generated in the composition, and therefore the deterioration in the emission characteristic can be suppressed, to thereby realize a preferable structure. Therefore, in order to have the chemically stable composition, preferably, the product phase has the composition expressed by the aforementioned composition formula $M_mA_aD_bO_oN_n:Z$ satisfying $n=2/3\ m+a+4/3b-2/3o$, $m/(a+b) \geqq 1/2$, $(o+n)/(a+b) > 4/3$, $o \geqq 0$. However, any one of the m, a, and b is not 0.

Further, in the product phase having the aforementioned composition formula $M_mA_aD_bO_oN_n:Z$, the element M is the element having +bivalent valency, the element A is the element having +tervalent valency, the element D is the element having +tetravalent valency, the oxygen is the element having-bivalent valency, the nitrogen is the element having-tervalent valency. Therefore, when the m, a, b, o, and n have the composition satisfying $n=2/3m+a+4/3b-2/3o$, the valency of each element is added to become zero, and preferably, the composition of the product phase becomes further stable compound. Further, in the case of o=0, satisfying m:a:b:n=1:1:1:3, the phosphor having excellent emission characteristic and excitation band characteristic is obtained. In any case, a slight deviation of the composition from the composition formula showing the composition of the product phase is allowable.

However, in some cases, the phosphor manufactured to satisfy o=0, and m:a:b:n=1:1:1:3 includes the aforementioned product phase and a slight amount of oxygen. It is considered that the oxygen thus slightly contained is the oxygen initially contained in the raw material, the oxygen mixed in by oxidization of the surface of the material when the material is weighed, mixed, and fired, and further the oxygen adsorbed on the surface of the phosphor after firing. When judging from an analysis result of the phosphor according to the examples as will be described later, less content of the oxygen in the phosphor is preferable from the viewpoint of the emission efficiency, and preferably the content of the oxygen to the mass of the product phase is 5.0 wt % or less, further preferably is 3 wt % or less.

In addition, when the aforementioned product phase is expressed by $M_mA_aD_bO_oN_n:Z_z$, preferably an amount of the element Z to be added is determined, so that the molar ratio z/(m+z) of the element M to the activator element Z is in the range of not less than 0.0001 and not more than 0.50. When the molar ratio z/(m+z) of the element M to the element Z is in the above-described range, deterioration in the emission efficiency can be averted, which is caused by concentration quenching due to excessive content of the activator (element Z). Meanwhile, the deterioration in the emission efficiency can also be averted, which is caused by insufficient emission contributing element due to inadequate content of the activator (element Z). Further, more preferably, the value of the z/(m+z) is in the range of not less than 0.0005 and not more than 0.1. However, an optimal value of the range of the value of the z/(m+z) is slightly fluctuated according to the kind of the activator (element Z) and the kind of the element M. Further, by controlling the amount of the activator (element Z) to be added also, the peak wavelength of the light emission of the product phase can be set so as to be shifted, and this is effective when adjusting the luminance in the light source.

Meanwhile, in the product phase having the aforementioned composition formula $M_mA_aD_bO_oN_n:Z$, the crystal structure of the product phase is changed by controlling the molar ratio o of the oxygen, and the peak wavelength of the light emission wavelength of the phosphor can be sifted in the range from 600 nm to 660 nm. However, in the case of m=a=b=1, as the concentration of the oxygen is thus increased, the light emission characteristic of the phosphor is deteriorated. Therefore, the molar ratio o of the oxygen is preferably controlled in the range of $0 \leqq o \leqq m$ When the oxygen content is in the range of $0 \leqq o \leqq m$, the generation of impurity composition can be suppressed, and the deterioration of the emission intensity of the product phase can be prevented. Further preferably, when the oxygen content to the mass of the product phase is 3 wt % or less and in the range of $0 \leqq o \leqq 0.1$, the position of a main peak in the X-ray diffraction pattern as will be described later is prevented from deviating from a preferable range of the Bragg angle (2θ), and the phosphor can exhibit a sufficient emission intensity.

When the phosphor of the present invention is manufactured as the raw material of the element M (+bivalent valency), the element A (+tervalent valency), the element D (+tetravalent valency), any compound of each nitride and oxide may be used. For example, the raw materials may be mixed by using the nitride ($M_3N_2$), oxide (MO) of the element M, and the nitride (AN, $D_3N_4$) of the element A and D. Then, by controlling the blending ratio of both of the nitride and the oxide, an amount of the oxygen and an amount of the nitrogen in the phosphor can be controlled, without changing the value of m. As a matter of course, the meaning of the nitride and the oxide is not limited to the compound obtained by combining with only oxygen, or combining with only nitrogen. For example, the compound here is obtained when carbonate and oxalate are decomposed during firing, to become substantially oxide, resulting in having the aforementioned elements and the oxygen. In the case of the nitrogen also, the compound has the aforementioned elements and the nitrogen. However, for simplifying the explanation, the oxide of the aforementioned elements, and the nitride of the aforementioned elements are explained as the compound having the aforementioned elements and the oxygen and as the compound having the aforementioned elements and the nitrogen, respectively.

For example, when the raw materials are weighed, under the condition of the oxygen molar ratio o=0, and m=a=b=1, each raw material may be weighed with the molar ratio of $M_3N_2:AN:D_3N_4=1:3:1$. Further, at this time, when the activator element Z is the element having bivalent valency, the element Z replaces a part of the element M. Therefore, when such a replacement is taken into consideration and the product phase is expressed by $M_mA_aD_bN_n:Z_z$, preferably (m+z)=a=b=1 is established. Thus, the composition of the product phase can have a chemically stable composition. Also, when the raw materials are weighed under the condition of the oxygen molar ratio o=0.25 and m=a=b=1, each raw material may be weighed with the molar ratio of $M_3N_2:MO:AN:D_3N_4=0.75:0.75:3:1$.

The element M is preferably at least one or more kind of element selected from the group consisting of Be, Mg, Ca, Sr, Ba, Zn, Cd, and Hg, further preferably is at least one or more kind of element selected from the group consisting of Mg, Ca, Sr, Ba, and Zn.

The element A is preferably at least one or more kind of element selected from the element having tervalent valency such as B (boron), Al, Ga, In, Tl, Y, Sc, P, As, Sb, and Bi, and further preferably is one or more kind of element selected from the group consisting of B, Al, and Ga, and most preferably is Al. As the Al, preferably AlN is used as a general thermoelectric material and structural material, is easily available at a low cost, and in addition, has a small environmental load.

The element D is preferably at least one or more kind of element selected from the group consisting of C, Si, Ge, Sn, Ti, Hf, Mo, W, Cr, Pb, and Zr, is further preferably the elements Si and/or Ge, and is most preferably the element Si. As the Si, preferably $Si_3N_4$, which is nitride, is used as the general thermoelectric material and structural material, is easily available at a low cost, and in addition has a small environmental load.

The element Z is preferably one or more kind of element selected from the rare earth elements or the transitional metal elements. From the viewpoint of exhibiting a sufficient color rendering properties by each kind of white light source such as the white LED lighting unit using the phosphor of the present invention, preferably the light emission of the product phase has the spectrum with a broad half value width. In addition, from the same viewpoint, preferably the element Z is one or more kind of element selected from the group consisting of Eu, Mn, Sm, and Ce. Among these elements, when Eu is used as the element Z, the product phase has the emission spectrum with a half value width of 50 nm or more in the range from orange color to red color, exhibiting a strong light emission with high emission efficiency. Therefore, this is preferable as the activator of each kind of light source such as a white light illumination and a white LED. In addition, the phosphor having the light emission with different wavelengths can be obtained, in accordance with the kind of the element Z which replaces a part of the element M in the composition of the product phase.

Particularly, when the light emission apparatus with excellent color rendering properties is manufactured by using the aforementioned phosphor, preferably the peak wavelength of the emission wavelength of the phosphor is set at 650 nm or more, and further preferably is set at 6565 mm or more. Here, as a general manufacturing method of the phosphor, the concentration of the activator element Z (here, the element Z is Eu, and is referred to as Eu in some cases hereafter) is increased, whereby the emission wavelength can be shifted toward the longer wavelength side. However, a phenomenon of concentration quenching occurs, such that the emission efficiency is deteriorated when the concentration of Eu is excessively increased. Therefore, the inventors of the present invention study on shifting of the emission wavelength further to the longer wavelength side without excessively increasing the content of Eu. As a result, although as will be described in detail, a structure is realized, in which the emission wavelength is efficiently shifted to the longer wavelength side by controlling a unit lattice of the crystal structure included in the phosphor.

As a result, the peak wavelength of the phosphor can be set at 650 nm or more without decreasing the emission efficiency, and chromaticity points of the light emission of the phosphor is substantially 0.65 or more on the x-axis, and 0.35 or less on the y-axis on the CIE chromaticity coordinates. Therefore, the emission spectrum of the phosphor takes the coordinates infinitely close to red color of the right end on the CIE chromaticity coordinates, and color reproducibility of the red color is improved as the light emission apparatus. In addition, when the light source emitting white light is manufactured by combining the phosphor of this invention and other phosphor, the mixing ratio of a red phosphor can be reduced, compared to the case of manufacturing the white light of the same color temperature by using the conventional red phosphor (for example, comparative example 1).

Particularly, in the white LED illumination obtained by combining the blue LED and the yellow phosphor (YAG:Ce), when the correlated color temperature of the light emission apparatus is set in the range from 7000K to 2500K by mixing with the phosphor of the present invention, the light emission apparatus exhibiting a significantly preferable color rendering properties is obtained, having 80 or more of average color rendering index Ra, and further preferably having 80 or more of R15 and 60 or more of R9. Further, when the color rendering property described above is exhibited, the mixing amount of the phosphor according to the present invention may be 20% or less of the yellow phosphor (YAG:Ce), and in this case, the light emission apparatus with excellent color rendering properties having 80 or more of Ra can be obtained without reducing the emission efficiency of the yellow phosphor.

When the phosphor of the present invention is used in a powdery shape, the average particle size of the phosphor powder is preferably 20 µm or less. This is because the light emission appears to occur mainly on the surface of the particle in the phosphor powder, and therefore when the average particle size (note that the average particle size of the present invention refers to a median size (D50).) is 20 µm or less, the surface area per unit weight of the powder can be secured, and the deterioration in luminance can be prevented. Further, when the powder is formed in a pasty state and is applied to a light emitting element or the like also, the density of the powder can be increased. From this viewpoint also, the deterioration in luminance can be prevented. In addition, according to the study of the inventors of the present invention, although detailed reason is unknown, from the viewpoint of the emission efficiency of the phosphor powder, it was found that preferably the average particle size was larger than 0.1 µm. As described above, the average particle size of the phosphor powder of the present invention is preferably 0.1 µm or more and 20 µm or less, and further preferably 3.0 µm or more and 15 µm or less. The average particle size (D50) specified here is the value measured by an LS230 (laser diffraction scattering method) manufactured by Beckman Coulter Inc. Also, from the aforementioned viewpoints, the value of the specific surface area (BET) of the phosphor powder of the present invention is 0.05 $m^2/g$ or more and 5.00 $m^2/g$ or less.

Next, a powder X-ray diffraction pattern shown by the phosphor of the present invention will be explained with reference to FIGS. 1A and 1B.

FIG. 1A is the powder X-ray diffraction pattern by CoKα ray of the phosphor according to an example 1 as will be described later as an example of the phosphor according to the present invention, and FIG. 1B is a comparative result of peaks between the X-ray diffraction pattern and a JCPDS card. Here, peak data that occupies an upper half portion of FIG. 1B shows the Bragg angle (2θ) and intensity of a main peak shown in FIG. 1A by the position and height of a line segment. Next, the card peak that occupies a lower half portion shows the Bragg angle (2θ) and intensity of a main peak of $CaAlSiN_3$ (39-0747) crystal described in the JCPDS card by the position and height of the line segment. (However, for simplifying the comparison between both peaks, the JCPDS card peak intensity of $CaAlSiN_3$ crystal is described by turning upside down.)

As clearly shown from the comparison between the both peaks shown in FIG. 1B, overall patterns of the main peaks of the phosphor of the present invention and the $CaAlSiN_3$ crystal described in the JCPDS card are similar. However, if the both peaks are observed in detail, any peak of the phosphor of the present invention is Lifted toward a smaller Bragg angle (2θ), and although there is a similarity between each crystal structure, these crystal structures have different crystal face intervals. The difference between both crystal structures is possibly caused as follows. Nitride raw materials such as $Ca_3N_2$, MN, and $Si_3N_4$ are used totally in the element forming a matrix structure of the phosphor according to the present invention, while CaO, AlN, and $Si_3N_4$ are used as the raw materials in the $CaAlSiN_3$ described in the JCPDS card. Therefore, there is a difference in the amount of the oxygen present in both crystal structures, and a part of Ca is replaced with Eu in the case of the phosphor according to the present invention. However, the overall patterns of the main peaks are similar, and therefore it appears that the product phase of the phosphor according to the present invention also has an orthorhombic crystal system similar to the $CaAlSiN_3$ crystal described in the JCPDS card.

As described above, the inventors of the present invention consider that although the product phase of the phosphor of the present invention has the crystal system similar to the $CaAlSiN_3$ crystal described in the JCPDS card, the phosphor according to the present invention has a new crystal structure having different crystal face intervals. Therefore, the structure of the phosphor according to the present invention having the new crystal structure is defined by the X-ray diffraction pattern shown by the phosphor.

Here, the main peak in the X-ray diffraction pattern of the product phase included in the phosphor of the present invention will be explained.

As clearly shown in FIG. 1A, the product phase included in the phosphor according to the present invention had characteristic peaks in the Bragg angle (2θ) range from 36.5° to 37.5°, 40.9° to 41.9°, 41.9° to 42.9°, 56.3° to 57.3°, 66.0° to 67.0°, 75.8° to 76.8°, and 81.0° to 83.0°, and among these ranges, the peak in the range from 36.5° to 37.5°, and 41.9° to 42.9° had a high intensity and particularly characteristic, followed by the characteristic peak in the range from 56.3° to 57.3°, and any of these peaks was a diffraction peak having 10% or more of relative intensity, when the relative intensity of the diffraction peak having the highest intensity in the X-ray diffraction pattern was defined as 100%. All of the characteristic diffraction peaks show that the crystal phase having a large crystal face interval than the $CaAlSiN_3$ crystal described in the aforementioned JCPDS card is generated as a single phase.

Further, if these peaks are observed from the viewpoint of the half value width of the diffraction pattern, the half value widths of these diffraction peaks are all 0.25° or less. These sharp diffraction peaks show that the product phase has not an amorphous structure but a structure excellent in crystallinity.

The relation between the aforementioned X-ray diffraction pattern, and the excellent emission characteristic and the excellent excitation band characteristic shown by the phosphor of the present invention has not been clarified yet, but is considered as follows.

First, it appears that there is a close relation between the fact that the X-ray diffraction pattern shows a peak pattern wherein a target product phase is obtained by a single phase, and the fact that the phosphor of the present invention has the excellent emission characteristic and the excellent excitation band characteristic. When the target product phase is thus obtained by a single phase, as a result, the peaks of the raw materials ($Ca_3N_2$, AlN, $Si_3N_4$, and $Eu_2O_3$) used for manufacturing the phosphor are not observed in the X-ray diffraction pattern. Specifically, during manufacturing the phosphor, in the case of an inadequate firing temperature and improper mixing amount of the raw materials, the raw materials excessively exists other than the target product phase, thereby reducing the amount of the phosphor per unit area irradiated with excitation light, and the raw materials thus excessively exist absorb the excitation light and emitted light, whereby the emission efficiency of the phosphor is deteriorated and the excellent emission characteristic can not be obtained. Accordingly, when there is no peak observed in the raw material in X-ray diffraction pattern, it appears that the phosphor to be measured has the excellent emission characteristic and the excellent excitation band.

Further, it appears that a high intensity of the X-ray diffraction peak reflects a high crystallinity of the product phase. When the light emission easily occurs around $Eu^{2+}$ in the product phase because of a higher crystallinity of the product phase and this structure further continues regularly, the excellent emission characteristic is obtained. Meanwhile, when the X-ray diffraction peak intensity is weak and the crystallinity is considered to be low, an order of the structure around the $Eu^{2+}$ serving as the center of the light emission is insufficient. Therefore, a distance between each $Eu^{2+}$ ions becomes too close, to thereby cause the concentration quenching and the situation that the $Eu^{2+}$ does not enter the site where the $Eu^{2+}$ must enter. Therefore, the excellent emission characteristic can not be obtained.

Finally, the inventors of the present invention found that the relative intensity of the peak observed near the Bragg angle (2θ) range from 38.0 to 40.0° was weak and further preferably no diffraction peak was observed in both ranges from 38.5 to 39.5° and 44.0 to 45.0°, and this reflects the fact that the excellent emission characteristic and the excellent excitation band characteristic can be obtained. This is because the peak observed near the Bragg angle (2θ) range from 38.0 to 40.0° is considered to the peak of AlN which is the raw material of the phosphor. Namely, as described above, during manufacturing the phosphor, in the case of the inadequate firing temperature and improper mixing amount of the raw materials, residual raw material exists in the phosphor after firing, having harmful effects on the emission characteristic or the like. Among the residual raw materials, if AlN remains, the residual AlN absorbs the emitted light and the excitation light of a phosphor sample because the AlN is gray, thereby directly leading to the deterioration of the emission intensity. Therefore, in order to obtain the phosphor with high emission intensity, a weaker diffraction peak intensity of the AlN near the range from 38.0 to 40.0° is preferable. Specifically, when the powder X-ray diffraction pattern by CoKα ray is measured and the relative intensity of the diffraction peak with highest intensity in the X-ray diffraction pattern is defined as 100%, it is preferable to allow no diffraction peak with the relative intensity of beyond 5% to exist. Further preferably, absolutely no diffraction peak (considered to be the diffraction peak of AlN) is observed in both ranges from 38.5 to 39.5° and 44.0 to 45.0°.

Here, explanation will be given to a measuring method of the powder X-ray diffraction pattern of the phosphor according to the present invention.

The phosphor to be measured was pulverized up to a predetermined average particle size (preferably 1.0 μm to 20.0 μm) by using pulverizing means such as the mortar and the ball mill after firing, and a holder made of titanium was filled with the phosphor thus pulverized to form a flat surface, then the phosphor was measured by an XRD apparatus, "RINT 2000" by RIGAKU DENKI CO., LTD. Measurement conditions are described below.

Used measuring apparatus: "RINT 2000" by RIGAKU DENNKI CO., LTD.
X-ray tube bulb: CoKα
Tube voltage: 40 kV
Tube current: 30 mA
Scanning method: 2θ/θ
Scanning speed: 0.3°/min
Sampling interval: 0.01°
Start angle (2θ): 10°
Stop angle (2θ): 90°

It appears that the deviation of the Bragg angle (2θ) is generated by factors such as an unflat sample face irradiated with X-ray, a measurement condition of the X-ray, and particularly difference in the scanning speed. Therefore, it appears that a slight deviation is allowable in the range where the aforementioned characteristic diffraction peak is observed. In this specification, in order to restrain such a deviation, the scanning speed is set at 0.3°/min, and in this condition, Si is mixed in the phosphor sample, and the deviation of Si peak is corrected after X-ray measurement, to thereby determine the Bragg angle (2θ).

Further, a crystal structure analysis of the phosphor sample was conducted by the inventors of the present invention by using a Rietveld method, based on the powder X-ray measurement result, in association with the measurement of a peak position of the XRD. By the Rietveld method, more accurate model of the crystal structure is guided by making various kinds of structural parameters more precise by a least square method in the model of the latter diffraction intensity of the X-ray, so as to make the difference small between a X-ray pattern obtained from an actual measurement and a X-ray pattern obtained from the theoretical calculation using a model of the estimated crystal structure. A program "RIETAN-2000" was used for a Rietveld analysis and the crystal structure of the $CaAlSiN_3$ described in the JCPDS card 30-0747 was used.

As a result of the analysis of the crystal structure by the Rietveld method, as shown in table 1, the lattice constant of the a-axis, b-axis, and c-axis in the crystal lattice of the phosphor sample was increased, in association with improvement of the emission characteristic of the phosphor sample, and along with this, the increase in volume of the crystal lattice was also observed. The volume is thus increased at a rate proportional to the decrease of the amount of the oxygen contained in the phosphor sample, and by such a decrease of the amount of the oxygen, the volume of the crystal lattice is increased. A detailed reason of this phenomenon is unknown. However, when the oxygen enters a $CaAlSiN_3$ lattice which constitutes the phosphor sample, the oxygen replaces the nitrogen in the lattice. Here, the lattice volume of the impurity phase which is generated by mixing-in of the oxygen is mailer than the lattice volume of the chase having no oxygen mixed-in. Therefore, it is considered that when the ratio of the impurity phase is large, the lattice volume of the phosphor sample in total becomes small. Accordingly, when the lattice constant and the lattice volume become large, the size of crystallites becomes large by decreasing of the ratio of the impurity phase, and this reveals that purer phase is generated.

As a result of inspecting the relation between the emission characteristic of the phosphor and the amount of the oxygen contained therein as an impurity by using various phosphor samples, it was found that in order to obtain the phosphor having 650 nm or more of emission peak wavelength, the amount of the oxygen contained as the impurity was preferably 3.0 wt % or less, and the lattice constant of each crystal lattice was a=9.75 Å or more, b=5.64 Å or more, c=5.05 Å or more, and the volume of the crystal lattice was 275.0 Å$^3$ or more, and further preferably a=9.80 Å or more, b=5.65 Å or more, c=5.06 Å or more and the volume of the crystal lattice was 280.5 Å$^3$. (In this invention, the a-axis, b-axis, and c-axis are shown in the order of the length satisfying a>b>c. The same thing can be said even if the order of the a, b, c is replaced with each other depending on determining the atomic coordinates.)

In addition, the relation between the emission characteristic of the phosphor and a crystallite size was inspected by using the aforementioned phosphor sample. Here, the crystallite size was obtained by the method described hereunder.

First, a half value width B was calculated for a plurality of diffraction peaks of the diffraction pattern obtained by the powder X-ray diffraction measurement of the phosphor sample according to the present invention. Then, by using a Sherrer's formula Dx=0.9λ/B cos θ (wherein, Dx is the size of a crystallite, λ, is the wavelength of X-ray used for measurement, B is the half value width of the diffraction peak, and θ is the Bragg angle of the diffraction peak), an averaged size (Dx) of the crystallite was obtained from the diffraction peak in the Bragg angle (2θ) range from 36.5° to 37.5°, 41.9° to 42.9°, and 56.3° to 57.3°. Then, it is reveled that the larger the size of the crystallite, the more improved in the crystallinity of a phosphor particle thus manufactured, and the improvement of the emission efficiency can be estimated. As a result of inspecting the relation between the emission characteristic of the phosphor and the crystallite size, by using various kinds of phosphor samples, it was found that in order to obtain the phosphor having 650 nm or more of emission peak wavelength, it was found that the crystallite size was 20 nm or more, more preferably was 50 nm or more, and further preferably 90 nm or more.

As described above, the inventors of the present invention achieves the crystal structure, the lattice constant, and the crystallite size contributing to the improvement of the emission characteristic of the phosphor sample by using the Rietveld method and the Sheller formula, and an importance of controlling the oxygen concentration in the phosphor sample for controlling the crystal structure, the lattice constant, and the crystallite size. Therefore, after further studying, the inventors of the present invention achieves the manufacturing method of the phosphor capable of controlling the oxygen concentration in the phosphor sample, and explanation will be given thereto hereunder.

First, in the manufacture of the phosphor, as a source of mixing-in of the oxygen in the step before firing, the oxygen contained in the raw materials and the oxygen adhered to the crucible or the like are considered. Therefore, it is important to reduce the amount of the oxygen thus mixed-in. However, it is difficult to remove all of the oxygen thus mixed-in. Here, the inventors of the present invention achieves the structure wherein the oxygen is removed in the step of firing in the phosphor manufacture, by making an atmosphere gas in a firing furnace reductive atmosphere at high temperature, to thereby decompose and nitride the raw material.

Further, as a result of studying on a reduction method of the amount of the oxygen remaining in the phosphor after firing, the inventors of the present invention achieved the possibility that the oxygen contained in $Eu_2O_3$, as the raw material was released by the high temperature reductive atmosphere and recombined to a crystalline phase of the phosphor generated during firing. Therefore, the inventors of the present invention achieved also the structure wherein in the firing step of the phosphor, the atmosphere gas was ventilated in the firing furnace, thereby controlling the ventilation flow rate to carry away the oxygen thus released from the sample to the outside the firing furnace.

Specifically, the atmosphere gas was continuously flown/exhausted in or out of the firing furnace. In this condition, the effect of reducing the amount of the oxygen in the sample was confirmed at 0.01 L/min or more of the ventilation amount, and a remarkable effect was confirmed with the increase of the ventilation amount. Accordingly, from the viewpoint of improving the emission characteristic of the phosphor, preferably the atmosphere gas to be introduced in the furnace is preferably ventilated at 0.01 L/min or more from the initial period of firing, and further preferably ventilated at 1.0 L/min or more.

Meanwhile, the pressure of the firing furnace in a firing step in the phosphor manufacture is preferably set in a pressurized state so that the oxygen in an atmosphere is not mixed in the furnace. However, when the pressure is beyond 0.1 MPa, a special pressure withstanding design is required in a design of a furnace installation. Therefore, preferably the pressure is 0.1 MPa or less in view of a productivity. In addition, when the pressure is increased, sintering between phosphor particles progresses excessively, thus making it difficult to pulverize after firing. Therefore, the pressure is preferably set at 0.001 MPa or more, and 0.05 MPa or less.

The atmosphere gas to be ventilated in the firing furnace is not limited to nitrogen, but any one of the ammonia, the mixed gas of the ammonia and the nitrogen, or the mixed gas of the nitrogen and the hydrogen may be used. However, as described above, when the oxygen is contained in the atmosphere gas, an oxidizing reaction of the phosphor particle occurs. Therefore, it is preferable to have the oxygen contained in the atmosphere gas as impurity, as little as possible, and preferably 100 ppm or less oxygen is contained therein. Further, when moisture is contained in the atmosphere gas, in the same way as the oxygen, the oxidizing reaction of the phosphor occurs during firing. Therefore, it is preferable to have the moisture contained as impurity, as little as possible, and preferably 100 ppm or less moisture is contained therein. Here, when a single gas is used as the atmosphere gas, a nitrogen gas is preferable. Although firing by using ammonia gas independently may be possible, the ammonia gas is increased in a cost and is corrosive gas. Therefore, a special treatment is required for an apparatus and an exhausting method at a low temperature. Accordingly, when the ammonia is used, lower concentration of the ammonia is preferable by mixing with the nitrogen. For example, when the mixed gas of the nitrogen gas and the ammonia is used, preferably the nitrogen is set at 80% or more, and the ammonia is set at 20% or less. Also, when the mixed gas of the nitrogen and other gas is used, nitrogen partial pressure is decreased in the atmosphere gas when gas concentration other than the nitrogen is increased. Therefore, from the viewpoint of accelerating a nitriding reaction of the phosphor, inert or reductive gas containing 80% or more of nitrogen is preferably used.

Next, the manufacture of $Ca_{0.985}AlSiN_3:Eu_{0.0150}$ will be explained as an example of the manufacturing method of the phosphor according to the present invention.

Each nitride raw material of the element M, the element A, and the element D may be a commercially available raw material. However, higher purity is preferable and the raw material with 2N or more, further preferably with 3N or more is therefore prepared. Preferably, the particle diameter of each particle of the raw material is generally a fine particle from the viewpoint of accelerating reaction. However, the particle size and the shape of the phosphor obtained are changed according to the particle size and the shape of the raw material. Therefore, by adjusting to the particle diameter required for the phosphor finally obtained, the nitride raw material and the oxide raw material having the particle approximating to the particle size of the phosphor thus obtained, may be prepared.

In regards to the raw material, from the viewpoint of the productivity of the phosphor, the average particle size of each raw material is preferably set at 0.1 μm or more, and 5.0 μm or less. Of course, preferably all the raw materials have the average particle size of 0.1 μm or more and 5.0 μm or less. However, by using the raw material having the aforementioned average particle size for AlN and $Si_3N_4$, which are the raw materials of the element forming a matrix structure having higher melting points, the phosphor having an excellent emission characteristic can be manufactured.

As the raw material of the element Z, the commercially available raw material such as nitride or oxide raw material, is preferable. Of course, higher purity of each raw material is preferable, and the raw material with 2N or more, further preferably with 3N or more is therefore prepared. Note that the oxygen contained in the oxide raw material of the element Z is slightly supplied in the composition of the product phase. Therefore, it is preferable to take an oxygen supply amount into consideration, when studying on blending the aforementioned element M raw material, element A raw material, and element D raw material. When the oxygen is contained as little as possible in the composition of the product phase, a simple substance of the element Z or the nitride of the element Z may be used as the raw material. However, as described above, by ventilating the atmosphere gas in the firing furnace, the amount of the oxygen in the composition can be reduced during firing. Therefore, preferably the oxide of the element Z which is easily available at a low cost on manufacturing may be used.

When manufacturing $Ca_{0.985}AlSiN_3:Eu_{0.0150}$, $Ca_3N_2$(2N), AlN(3N), $Si_3N_4$(3N) may be prepared respectively as the nitride of the element M, the element A, and the element D, for example. $Eu_2O_3$(3N) is prepared as the element Z.

These raw materials are weighed and mixed to become 0.985/3 mol of $Ca_3N_2$, 1.0 mol of AlN, 1/3 mol of $Si_3N_4$, and 0.015/2 mol of $Eu_2O_3$, so that the molar ratio of each element becomes Ca:Al:Si:Eu=0.985:1:1:0.015.

The nitride of each raw material element is easily influenced by oxygen and humidity, and therefore it is preferable to operate the weighing and mixing in a glove box under an inert atmosphere. The inert gas used as an atmosphere may be used, from which the oxygen and the humidity is sufficiently removed. When the nitride raw material is used as each raw material element, a dry mixing system is preferable as a mixing system to avoid the decomposition of the raw material. A usual dry mixing method using a ball mill and a mortar may be used.

The raw material thus mixed is put in a crucible, retained and fired in the inert atmosphere such as nitrogen at not less than 1000° C., preferably at not less than 1400° C., and more preferably at not less than 1500° C. and not more than 1600° C. for 30 minutes or more. Note that higher firing temperature allows the solid-phase reaction to progress rapidly, thereby shortening a retaining time. However, excessively higher firing temperature allows the sintering between particles to become violent, thereby progressing a particle growth, whereby a coarse particle is generated and an evaporation or reduction of the raw material occurs. Therefore, preferably the firing temperature is set at 1600° C. or less. Meanwhile, even when the firing temperature is low, a target emission characteristic can be obtained by maintaining the aforementioned temperature for a long time. In addition, longer sintering allows a particle growth to progress, thereby enlarging a particle shape. Therefore, the sintering time may be set in accordance with a target particle size.

Note that as described above, when the atmosphere gas is continuously ventilated in the firing furnace during firing, the effect of reducing the amount of the oxygen in a phosphor crystal is confirmed at 0.01 L/min or more of the ventilation amount, and the effect becomes remarkable with the increase of the ventilation amount. Accordingly, preferably 0.01 L/min or more of the atmosphere gas to be introduced in the furnace is ventilated from the initial period of firing, and further preferably 1.0 L/min or more of the atmosphere gas is ventilated.

Further, when the crucible formed of BN (boron nitride) is used as a crucible, preferably the mixing-in of the impurities from the crucible can be prevented. After completing the firing, the fired material is taken out from the crucible, and is pulverized up to a predetermined average particle size by using pulverizing means such as a mortar and a ball mill, whereby the phosphor containing the product phase expressed by the composition formula $Ca_{0.985}AlSiN_3:Eu_{0.015}$ can be manufactured.

Even when other element is used as the element M, the element A, the element D, and the element Z, and an activating amount of an activator Eu is changed, the phosphor containing the product phase having a predetermined composition formula can be manufactured by the same manufacturing method as described above, by adjusting the blending amount of each raw material during mixing to a predetermined composition ratio.

As described above, the phosphor according to the present invention has an excellent excitation band in a broad range from the ultraviolet to visible light (wavelength range from 250 to 550 nm), and the emission intensity of the aforementioned phosphor is high. Therefore, by combining with a light emission part emitting the light of the ultraviolet to blue color, the light source and the LED with high output and further an illumination unit including such light source and LED can be obtained.

Specifically, by combining the phosphor according to the present invention in a powdery state with the light emission part (particularly, the light emission part emitting the light with the wavelength range from 250 nm to 550 nm) by the known method, various display device and illumination units can be manufactured. For example, by combining with a discharge lamp generating the ultraviolet light, a fluorescent lamp, the illumination unit and the display device can be manufactured, or by combining with the LED light emitting element emitting the light of the ultraviolet to blue color also, the illumination unit and the display device can be manufactured. Further, by combining the phosphor of the present invention with an apparatus generating electron beam, the display device can be manufactured.

EXAMPLES

The present invention will be specifically explained based on the examples hereunder.

Example 1

Commercially available $Ca_3N_2(3N)$, $AlN(3N)$, $Si_3N_4(3N)$, and $Eu_2O_3(3N)$ were prepared, and each raw material was weighed to obtain 0.985/3 mol of $Ca_3N_2$, 1.0 mol of AlN, 1/3 mol of $Si_3N_4$, and 0.015/2 mol of $Eu_2O_3$, and thereafter was mixed in the glove box under the nitrogen atmosphere by using the mortar. The raw materials thus mixed were put in the crucible and set in the firing furnace, and retained/fired for 3 hours at 1600° C. in the nitrogen atmosphere wherein the pressure is set at 0.05 MPa, with the nitrogen ventilated at 1.0 L/min while maintaining the aforementioned 0.05 MPa pressure. Thereafter, the fired object thus obtained were cooled from 1600° C. to 200° C. for 1 hour, then the phosphor including the product phase expressed by the composition formula $Ca_{0.985}AlSiN_3:Eu_{0.0150}$ was obtained. The particle size of the obtained phosphor sample was 3 to 4 μm by SEM observation. (hereafter, in the examples 2 to 6 also, the particle size of the obtained phosphor was 3 to 4 μm by SEM observation.)

The phosphor thus obtained was irradiated with the light with the wavelength of 460 nm emitted from the excitation light source, and the emission characteristic was measured. In the items of the emission characteristic thus measured, the peak wavelength is the wavelength shown by (nm) of the peak showing the wavelength with highest emission intensity in the emission spectrum. The emission intensity shows the emission intensity in the peak wavelength with a relative intensity, with the intensity of the example 2 defined as 100%, the luminance is the value of Y obtained based on a calculation method in the XYZ color system defined in JIS Z8701, and the chromaticity x, y is obtained by the calculation method defined in the JIS Z8701. In addition, the oxygen and nitrogen concentrations (O/N) contained in a phosphor particle sample are the values measured by using an oxygen/nitrogen simultaneous analysis apparatus (TC-436) made by LECO INC., and other element concentration is the value measured by using the ICP.

A measurement result of a concentration analysis of each element, the emission characteristic, and a powder characteristic of the aforementioned phosphor is shown in table 1.

Next, a powder X-ray diffraction pattern of the aforementioned phosphor sample and the comparison result with JCPDS card are shown in FIGS. 1A and 1B.

It is found from FIGS. 1A and 1B that the crystal structure of the phosphor according to the example 1 is similar to the $CaAlSiN_3$ crystal described in the JCPDS card in overall patterns of the main peaks of the X-ray diffraction pattern. However, the both crystal structures are considered to have different crystal face intervals, due to the difference of the amount of the oxygen which both crystal structures have and the fact that a part of Ca is replaced with Eu. However, it appears that the product phase of the phosphor according to the present invention also has the orthorhombic crystal similar to the $CaAlSiN_3$ crystal described in the JCPDS card.

In regards to the main peak in the X-ray diffraction pattern, the product phase included in the phosphor according to the example 1 also has characteristic peaks in the Bragg angle (2θ) range from 36.5° to 37.5°, 40.9° to 41.9°, 41.9° to 42.9°, 56.3° to 57.3°, 66.0° to 67.0°, 75.8° to 76.8°, and 81.0° to 83.0°, and among them, the peak in the range from 36.5° to 37.5°, and 41.9° to 42.9° has a high intensity and particularly characteristic, and the peak in the range from 56.3° to 57.3° is the characteristic peak that follows, and any of these peaks was a diffraction peak having 10% or more of relative intensity, when the relative intensity of the diffraction peak having the highest intensity in the X-ray diffraction pattern is defined as 100%.

Further, when these peaks are observed from the viewpoint of the half value width of the diffraction pattern, the half value widths of these diffraction peaks are all 0.25° or less. The aforementioned sharp diffraction peak shows that the product phase has not an amorphous structure but the structure excellent in crystallinity.

From the measurement result of the oxygen/nitrogen concentration, it was found that analytical values of the oxygen concentration and the nitrogen concentration in the phosphor sample were 2.4 wt % and 28.5 wt %, respectively. Meanwhile, the oxygen concentration and the nitrogen concentration calculated from a raw material mixing amount of the phosphor sample were 0.3 wt % and 30 wt %, respectively.

When both concentrations are compared, in regards to the oxygen concentration, a fair amount of oxygen is contained in the sample with respect to 0.3 wt % oxygen concentration in the raw materials. About 2 wt % of extra oxygen thus contained is considered to be the oxygen initially adhered to the surface of the raw material, the oxygen mixed in by oxidization of the surface of the raw material during mixing and firing, and the oxygen adsorbed on the surface of the phosphor sample after firing, and considered to be the oxygen that exists separately from the structure of the product phase.

Meanwhile, in regards to the nitrogen concentration, an approximately the same amount of nitrogen (30 wt %) as 28.5 wt % nitrogen concentration in the product phase is contained in the sample. From this result, it appears that there is almost no nitrogen that exists separately from the structure of the product phase.

Figure 3:
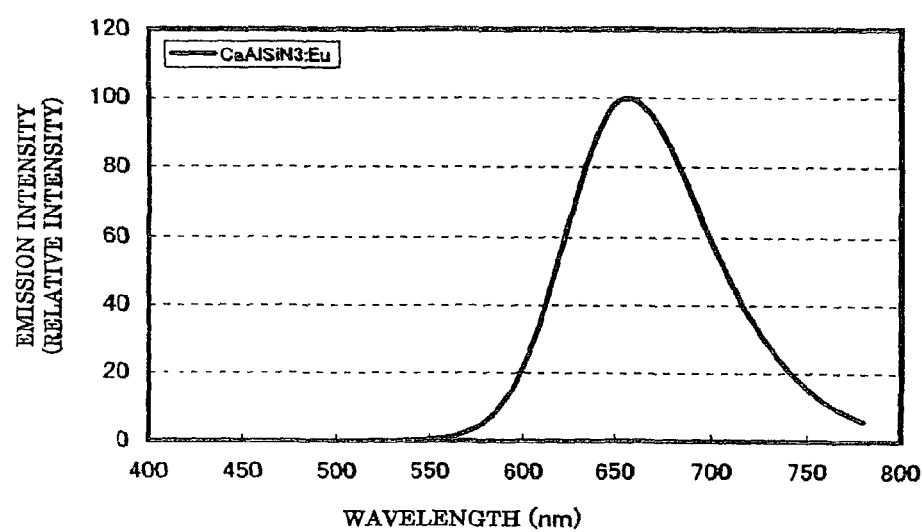
FIG. 3 is a graph showing an emission spectrum of the main product phase of the phosphor according to the present invention.

Further, an excitation spectrum showing the excitation band of the phosphor sample and the emission spectrum showing the emission characteristic are measured, and a result thereof is shown in FIG. 2 and FIG. 3.

FIG. 2 is a graph showing the relative intensity taken on the ordinate axis and the excitation wavelength (nm) taken on the abscissa axis, and the excitation spectrum of the phosphor sample is plotted by solid line.

As clearly shown from the measurement result of FIG. 2, the excitation spectrum of the phosphor sample according to the example 1 exists over the broad range from 250 nm to 600 nm, and it was found that the light of the broad range from the ultraviolet to visible light could be sufficiently effectively utilized.

FIG. 3 is a graph showing the relative intensity taken on the ordinate axis, and the emission wavelength (nm) taken on the abscissa axis, and the emission spectrum of the phosphor sample is plotted by solid line.

As clearly shown from the measurement result of FIG. 3, it was found that the emission spectrum of the phosphor sample according to the example 1 had a peak value at 654 nm and had the half value width over the range of high visibility.

Example 2

The phosphor of an example 2 was obtained in the same way as the example 1, excepting that the mixed raw material was put in the crucible and retained and fired for 3 hours at 1500° C. in the nitrogen atmosphere, and thereafter cooled for 1 hour from 1500° C. to 200° C., to obtain the phosphor containing the product phase expressed by the composition formula $Ca_{0.985}AlSiN_3:Eu_{0.0150}$.

The measurement result of the oxygen/nitrogen concentrations, the emission characteristic, and the powder characteristic of the phosphor sample are shown in table 1, and the powder X-ray diffraction pattern of the phosphor thus obtained is shown by thick solid line in FIGS. 4A to 4G.

Figure 4B:
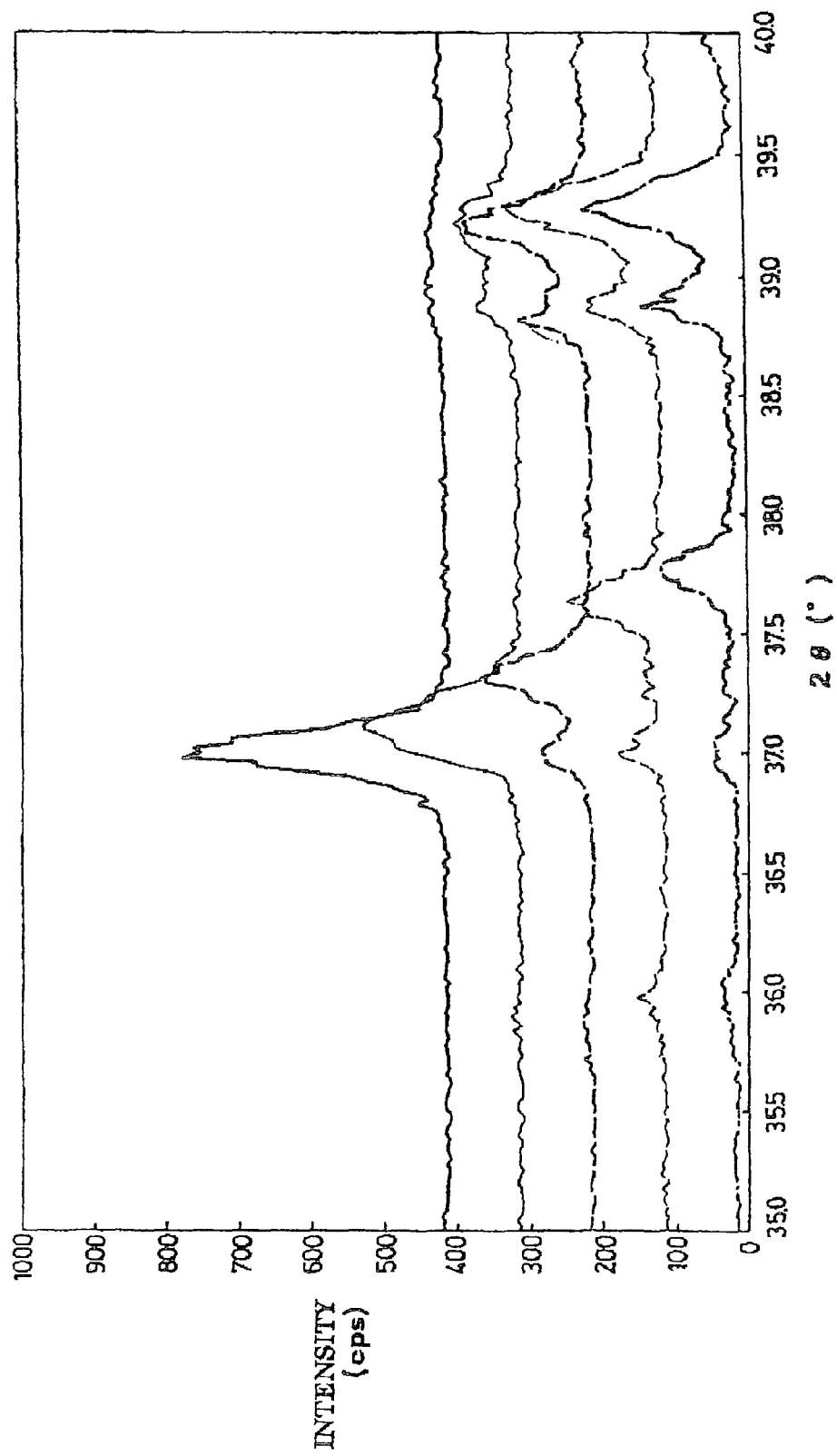
FIG. 4B is an expanded view of the powder X-ray diffraction pattern of the main product phase of the phosphor according to the examples 2 to 4 of the present invention.
Figure 4C:
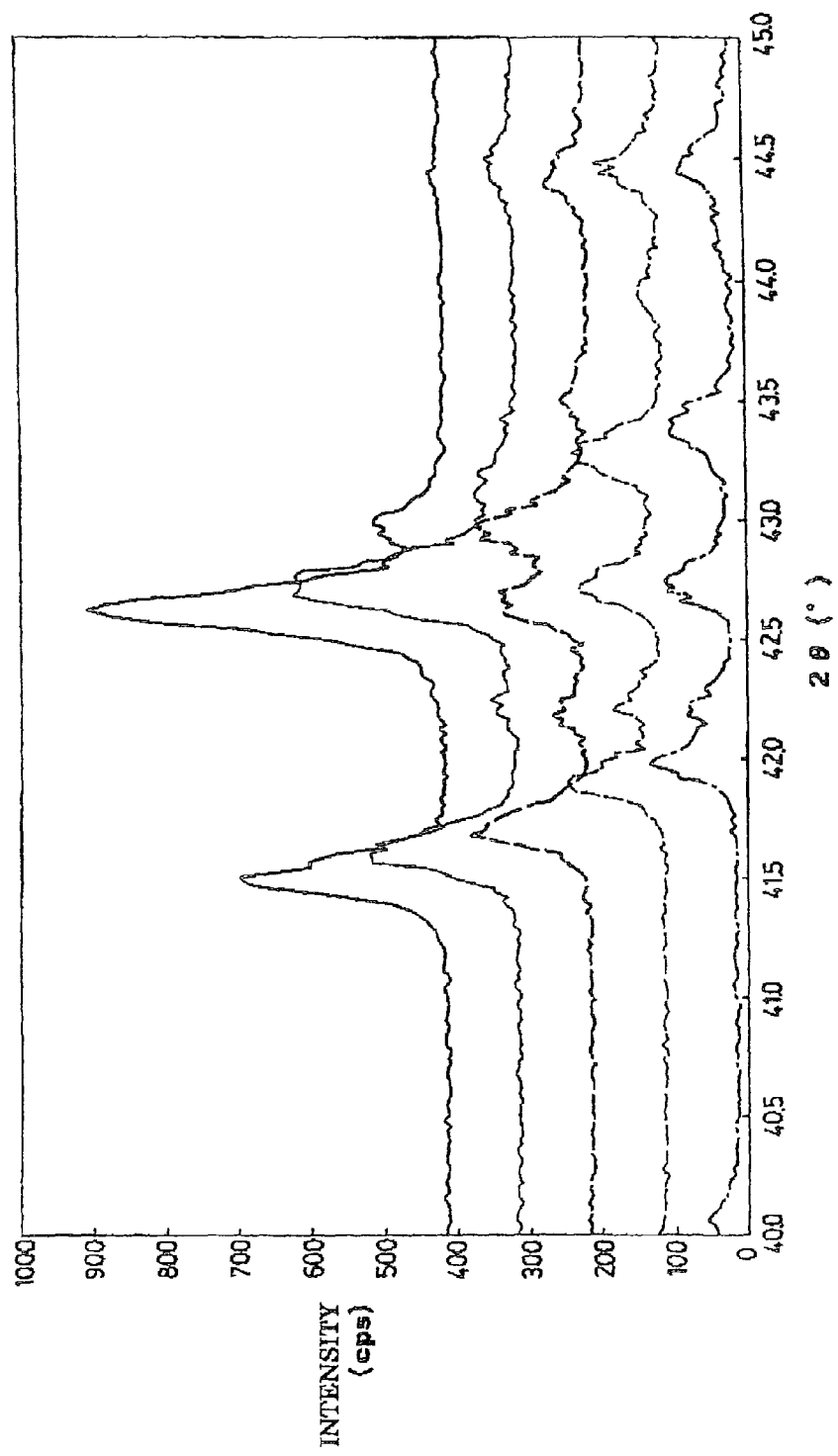
FIG. 4C is an expanded view of the powder X-ray diffraction pattern of the main product phase of the phosphor according to the examples 2 to 4 of the present invention.
Figure 4D:
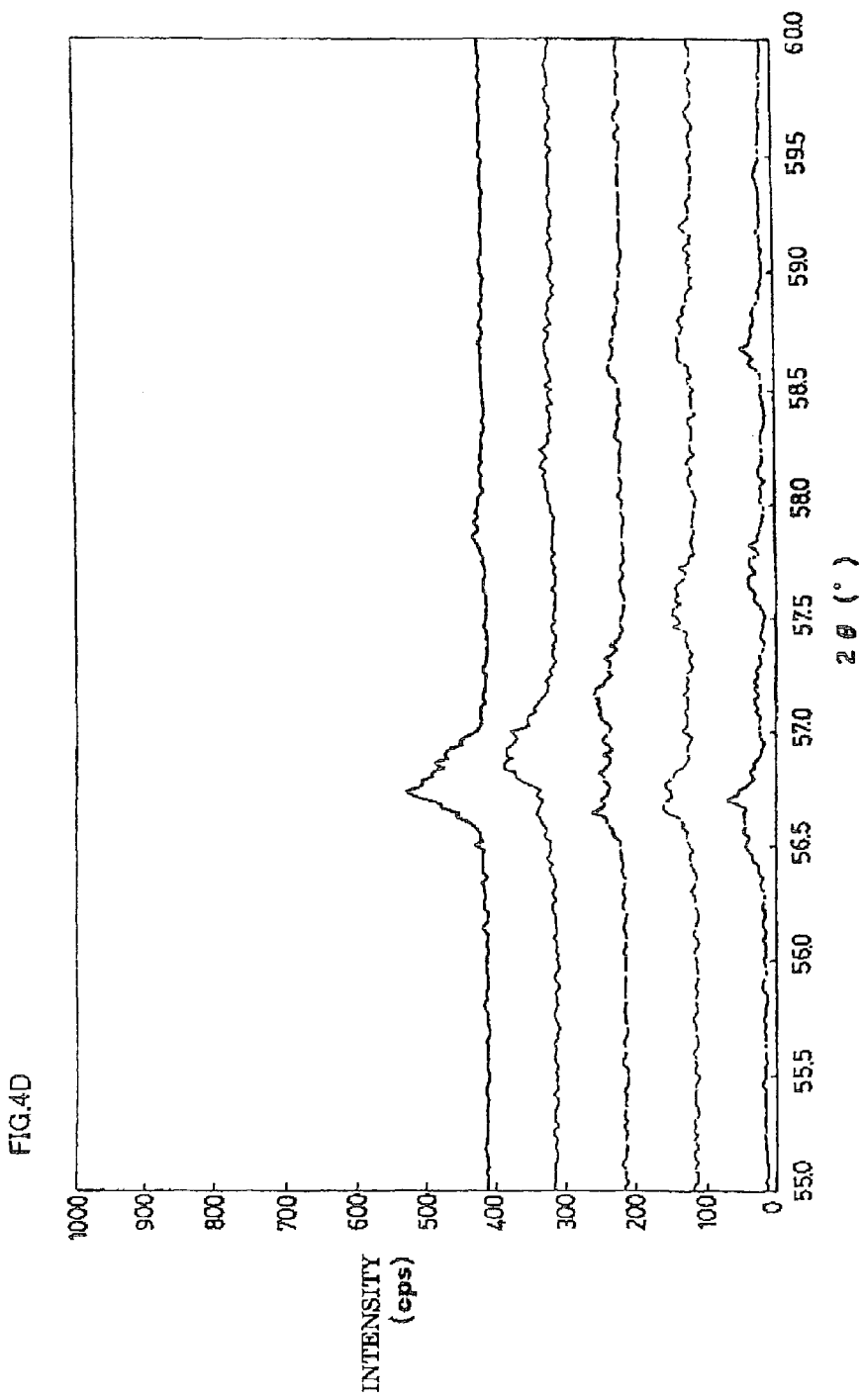
FIG. 4D is an expanded view of the powder X-ray diffraction pattern of the main product phase of the phosphor according to the examples 2 to 4 of the present invention.
Figure 4E:
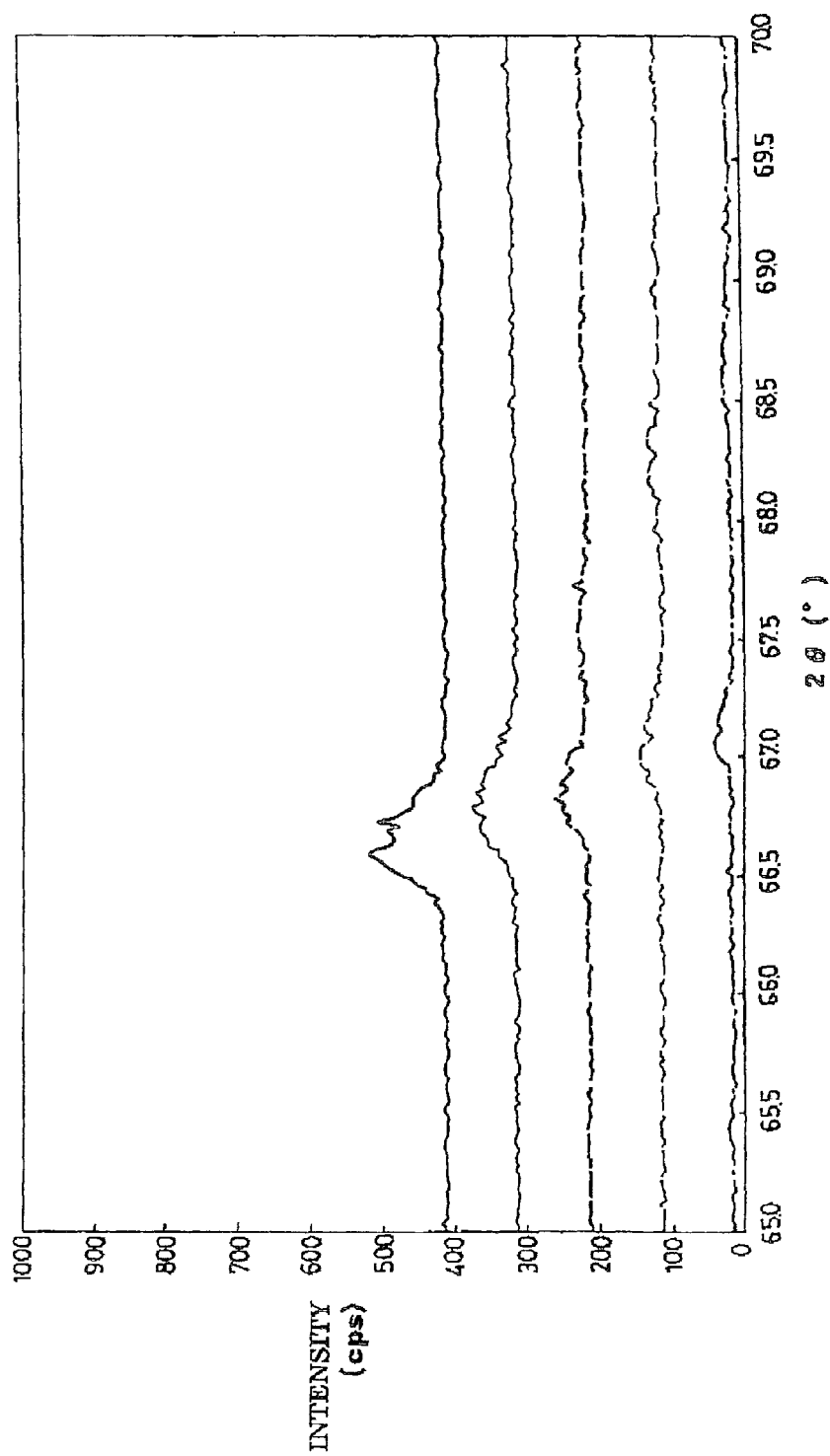
FIG. 4E is an expanded view of the powder X-ray diffraction pattern of the main product phase of the phosphor according to the examples 2 to 4 of the present invention.
Figure 4F:
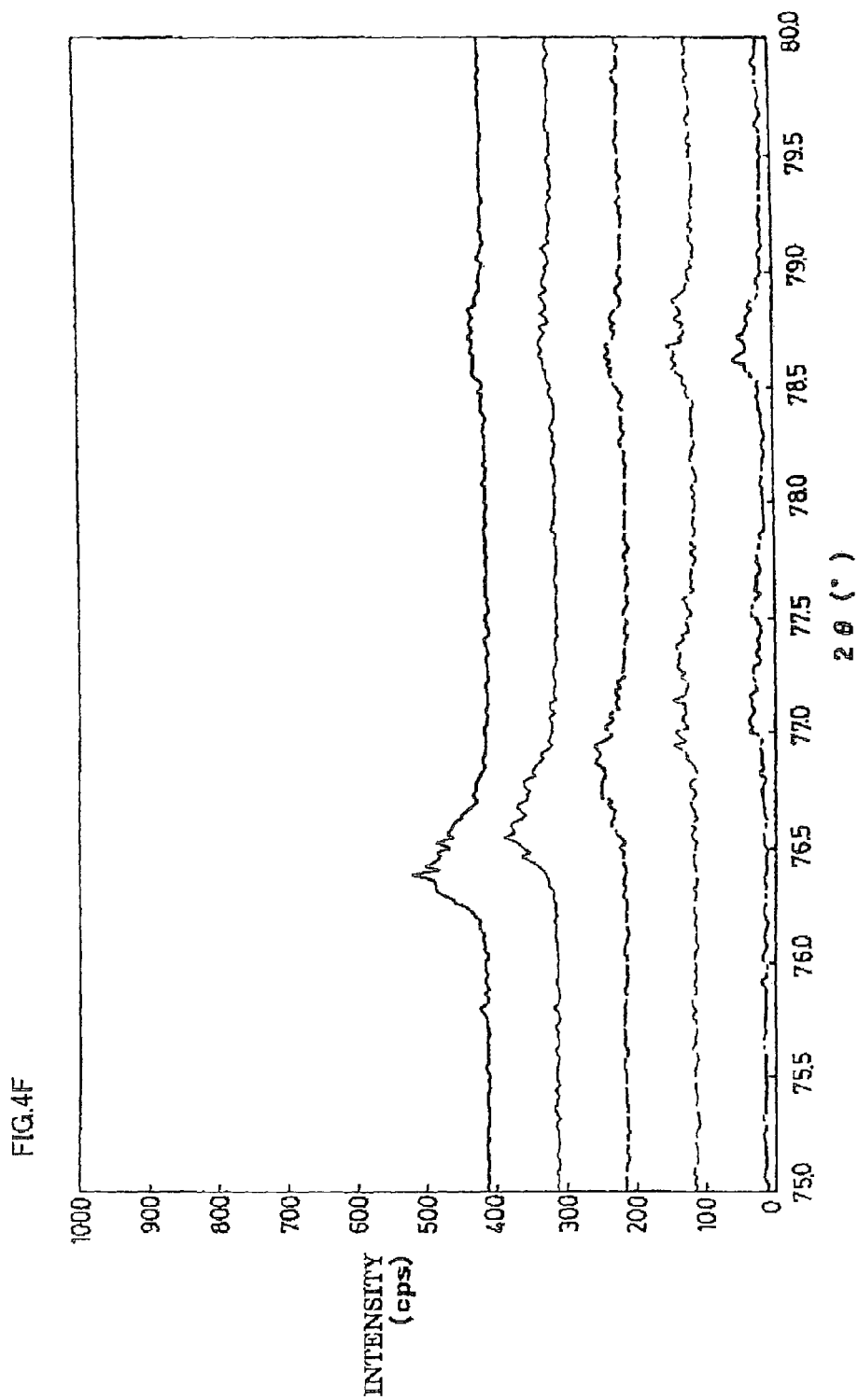
FIG. 4F is an expanded view of the powder X-ray diffraction pattern of the main product phase of the phosphor according to the examples 2 to 4 of the present invention.
Figure 4G:
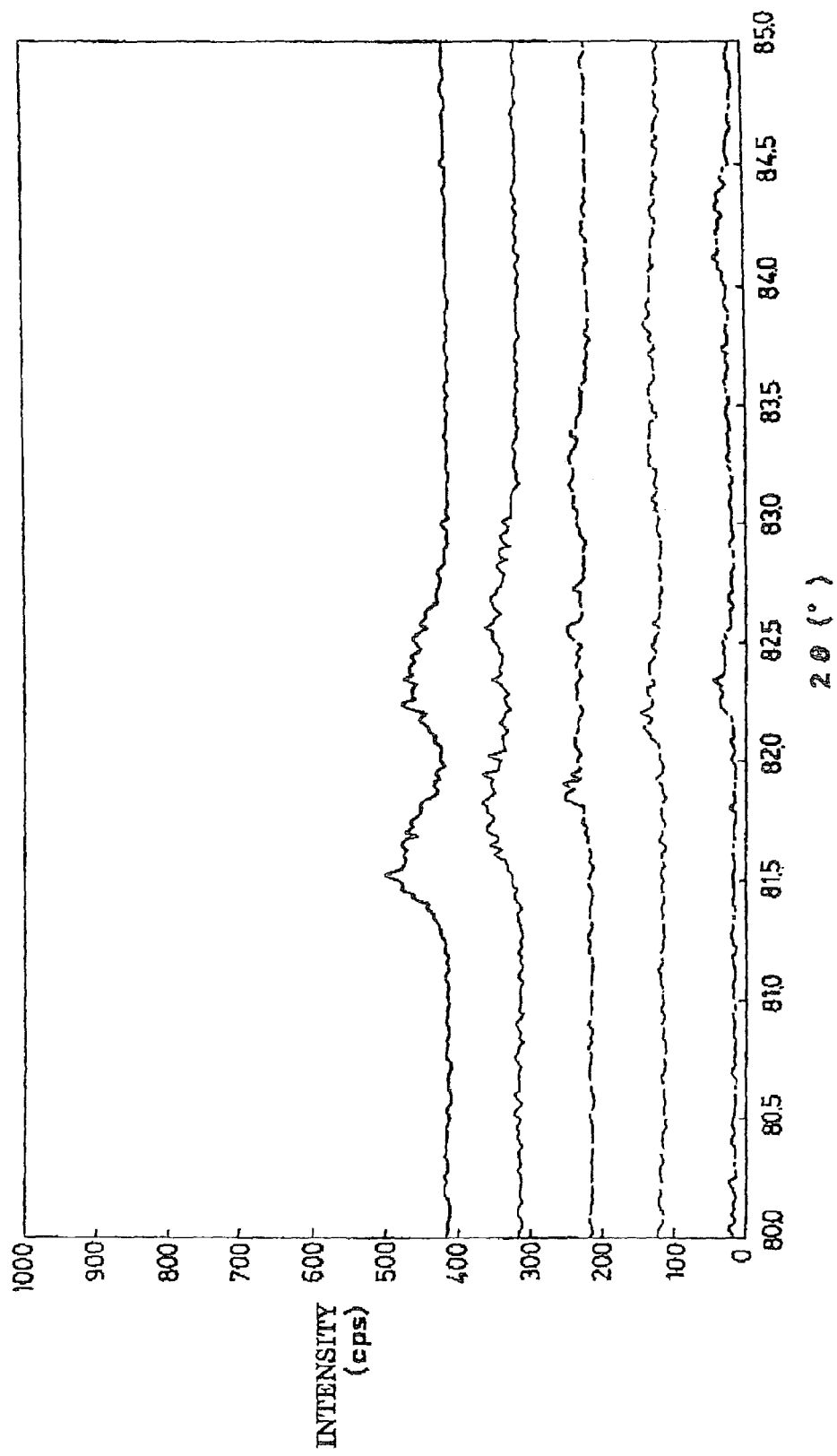
FIG. 4G is an expanded view of the powder X-ray diffraction pattern of the main product phase of the phosphor according to the examples 2 to 4 of the present invention.

In FIG. 4, FIG. 4A shows the X-ray diffraction pattern over the entire Bragg angle (2θ) range from 0° to 90°, and FIGS. 4B to 4G are expanded views of characteristic parts of the Bragg angle, wherein FIG. 4B shows the characteristic Bragg angle range from 35° to 40°, FIG. 4C shows the range from 40° to 45°, FIG. 4D shows the range from 55° to 60°, FIG. 4E shows the range from 65° to 70°, FIG. 4F shows the range from 75° to 80°, and FIG. 4G shows the range from 80° to 85°.

Example 3

In the mixing ratio of each raw material, the phosphor sample according to the example 3 was manufactured in the same way as the example 2, excepting that $Ca_3N_2$ was selected to be (0.985−0.25)/3 mol and CaO was selected to be 0.25 mol, and the emission characteristic was measured. The measurement result of the oxygen/nitrogen concentrations, the emission characteristic, and the powder characteristic of the phosphor sample are shown in table 1, and the powder X-ray diffraction pattern thus obtained is shown by thin solid line in FIGS. 4A to 4G.

Example 4

In the mixing ratio of each raw material, the phosphor sample according to the example 4 was manufactured in the same way as the example 2, excepting that the $Ca_3N_2$ was selected to be (0.985−0.50)/3 mol and the CaO was selected to be 0.50 mol, and the emission characteristic was measured. The measurement result of the oxygen/nitrogen concentrations, the emission characteristic, and the powder characteristic of the phosphor sample are shown in table 1, and the powder X-ray diffraction pattern thus obtained is shown by thick solid line in FIGS. 4A to 4G.

Example 5

In the mixing ratio of each raw material, the phosphor sample according to the example 5 was manufactured in the same way as the example 2, excepting that the $Ca_3N_2$ was selected to be (0.985−0.75)/3 mol and the CaO was selected to be 0.75 mol, and the emission characteristic was measured. The measurement result of the oxygen/nitrogen concentrations, the emission characteristic, and the powder characteristic of the phosphor sample are shown in table 1, and the powder X-ray diffraction pattern thus obtained is shown by thin solid line in FIGS. 4A to 4G.

Example 6

In the mixing ratio of each raw material, the phosphor sample according to the example 6 was manufactured in the same way as the example 2, excepting that the CaO was selected to be 0.985 mol, and the emission characteristic was measured. The measurement result of the oxygen/nitrogen concentrations, the emission characteristic, and the powder characteristic of the phosphor sample are shown in table 1, and the powder X-ray diffraction pattern thus obtained is shown by thick one dot chain line in FIGS. 4A to 4G.

TABLE 1

| | OXYGEN/NITROGEN CONCENTRATION | | PEAK WAVELENGTH | EMISSION INTENSITY | LUMINANCE | CHROMATICITY | | PARTICLE SIZE |
|---|---|---|---|---|---|---|---|---|
| | O (wt %) | N (wt %) | (nm) | (%) | (%) | x | y | (μm) |
| EXAMPLE 1 | 2.2 | 27.5 | 656.2 | 115.0 | 104.8 | 0.679 | 0.320 | 4.67 |
| EXAMPLE 2 | 2.4 | 28.5 | 654.0 | 100.0 | 100.0 | 0.675 | 0.324 | 4.70 |
| EXAMPLE 3 | 5.2 | 25.1 | 646.1 | 69.7 | 102.6 | 0.649 | 0.350 | 5.04 |
| EXAMPLE 4 | 7.3 | 21.1 | 637.5 | 40.7 | 105.1 | 0.599 | 0.398 | 5.68 |
| EXAMPLE 5 | 9.0 | 21.0 | 624.5 | 30.8 | 102.0 | 0.571 | 0.426 | 7.16 |
| EXAMPLE 6 | 11.3 | 20.7 | 611.0 | 22.4 | 98.4 | 0.540 | 0.451 | 9.75 |
| EXAMPLE 7 | 1.9 | 28.0 | 659.0 | 116.5 | 105.2 | 0.683 | 0.317 | 5.34 |
| EXAMPLE 8 | 1.8 | 28.5 | 659.5 | 117.7 | 105.3 | 0.683 | 0.316 | 5.39 |
| COMPARATIVE | 3.6 | 28.1 | 653.8 | 96.4 | 100.0 | 0.674 | 0.325 | 5.20 |

TABLE 1-continued

| | BET (m²/g) | CRYSTALLITE SIZE (Dx) (nm) | CRYSTAL LATTICE CONSTANT | | | | DURABILITY EVALUATION (%) | ABSOLUTE DENSITY (g/cc) |
|---|---|---|---|---|---|---|---|---|
| | | | a-axis (Å) | b-axis (Å) | c-axis (Å) | unit volume (Å³) | | |
| EXAMPLE 1 | 1.10 | 90.8 | 9.806 | 5.653 | 5.066 | 280.8 | −0.1 | 3.252 |
| EXAMPLE 2 | 1.00 | 92.8 | 9.796 | 5.649 | 5.062 | 280.1 | −1.1 | 3.248 |
| EXAMPLE 3 | 0.96 | 68.5 | 9.755 | 5.634 | 5.045 | 277.3 | −5.0 | 3.206 |
| EXAMPLE 4 | 0.83 | 76.2 | 9.749 | 5.599 | 5.030 | 274.6 | −7.0 | 3.190 |
| EXAMPLE 5 | 0.77 | — | — | — | — | — | — | — |
| EXAMPLE 6 | 0.63 | — | — | — | — | — | — | — |
| EXAMPLE 7 | 1.01 | 101.9 | 9.806 | 5.655 | 5.067 | 281.0 | 0.0 | 3.241 |
| EXAMPLE 8 | 0.99 | 102.6 | 9.808 | 5.656 | 5.068 | 281.1 | 0.0 | 3.243 |
| COMPARATIVE EXAMPLE 3 | 1.15 | 87.6 | 9.790 | 5.641 | 5.058 | 279.3 | −2.1 | 3.233 |
| PDF-39-0747 | — | — | 9.584 | 5.629 | 4.986 | 269.0 | — | — |

(Study on the Examples 2 to 6)

1.) Oxygen and Nitrogen Concentrations in the Phosphor

The mixing amount of the oxygen is increased as the examples are moved from the examples 2 to 6, by changing the mixing ratio of the $Ca_3N_2$ to CaO in the raw material. Therefore, the analytical value of the oxygen concentration in the phosphor is also increased. In addition, the oxygen concentration in the phosphor becomes larger than the value calculated from the mixing amount of the oxygen. This is because the oxygen is not only contained in the structure of the phosphor but is present in such a way that it is adsorbed on the surface or the like of the phosphor powder, in the phosphor according to the examples 2 to 6. Meanwhile, in regards to the analytical value of the nitrogen concentration, almost the same amount of the nitrogen as the mixing amount of the nitrogen is contained in the sample. From this result, it is considered that almost no nitrogen is separately present from the structure of the product phase, and the nitrogen is contained in the structure of the phosphor.

2.) Relation Between the Oxygen Concentration in the Phosphor and the X-Ray Diffraction Pattern It was found that the emission intensity of the phosphor was deteriorated as the examples were moved from the examples 2 to 6. When the emission intensity of the example 2 is defined as 100% as the relative intensity, the phosphor of the example 3 have about 70% of the relative intensity, while the phosphor of the examples 4 to 6 have 40% or less of the relative intensity.

Here, explanation is given to the relation between the amount of the oxygen contained in the structure of the phosphor and the X-ray diffraction pattern in the examples 2 to 6, with reference to FIG. 4A to 4G. As clearly shown in FIG. 4A to 4G, it was found that the Bragg angle (2θ) having characteristic peaks in the range from 36.5° to 37.5°, 41.9° to 42.9°, 40.9° to 41.9°, 56.3° to 57.3°, 66.0° to 67.0°, 75.8° to 76.8°, and 81.0° to 83.0°, was shifted toward a higher angle side, so as to close to that of the $CaAlSiN_3$ crystal described in the JCPDS card. It was found that the crystallinity was deteriorated, because the intensity of the X-ray diffraction peak was decreased in association with the increase of the amount of the oxygen in the phosphor.

This is because the crystal structure of the phosphor is changed, by the increase of the amount of the oxygen contained in the structure of the phosphor. Further, as is seen in the examples 4, 5, and 6, when 0.50 mol or more of CaO is mixed and the mixing amount of the oxygen is increased, the impurity phase is generated and an unreacted material is remained, to thereby possibly deteriorate the emission intensity.

Accordingly, from the viewpoint of obtaining the phosphor with high emission intensity, and when the relative intensity of the diffraction peak with highest intensity was defined as 100% in the powder X-ray diffraction pattern by CoKα ray, it was found that the phosphors shown in the examples 2 and 3 were preferable, which have firstly the Bragg angle (2θ) of the main peak with the relative intensity of 10% or more in the range from 36.5° to 37.5° and 41.9° to 42.9°, and secondarily the Bragg angle (2θ) of the characteristic peak in the range from 56.3° to 57.3°, and thirdly the Bragg angle (2θ) of the further characteristic peak in the range from 40.9° to 41.9°, 66.0° to 67.0°, 75.8° to 76.8°, and 81.0° to 83.0°.

3.) Relation Between the Oxygen Concentration in the Phosphor and the Peak Wavelength of the Emission Spectrum It was found that the peak wavelength of the emission spectrum of the phosphor was decreased from 654 nm to 611 nm, as the examples were moved from the example 2 to example 6.

4.) Relation Between the Oxygen Concentration in the Phosphor and the Emission Luminance It was found that the luminance of the phosphor of each example was approximately constant in the examples 2 to 6. This is because the phosphor exhibits the luminance of approximately constant value by the shift of emission spectrum to a high visibility region of a human being when the peak wavelength of the light emission is decreased, while the emission intensity of the phosphor is deteriorated as the examples move from the examples 2 to 6.

Example 7

$CaAlSiN_3$:Eu was manufactured in the same way as the example 1, excepting that the firing temperature is set at 1500° C., the firing time is set at 6 hours, and a ventilation amount of the nitrogen is set at 5.0 L/min.

Figure 7:
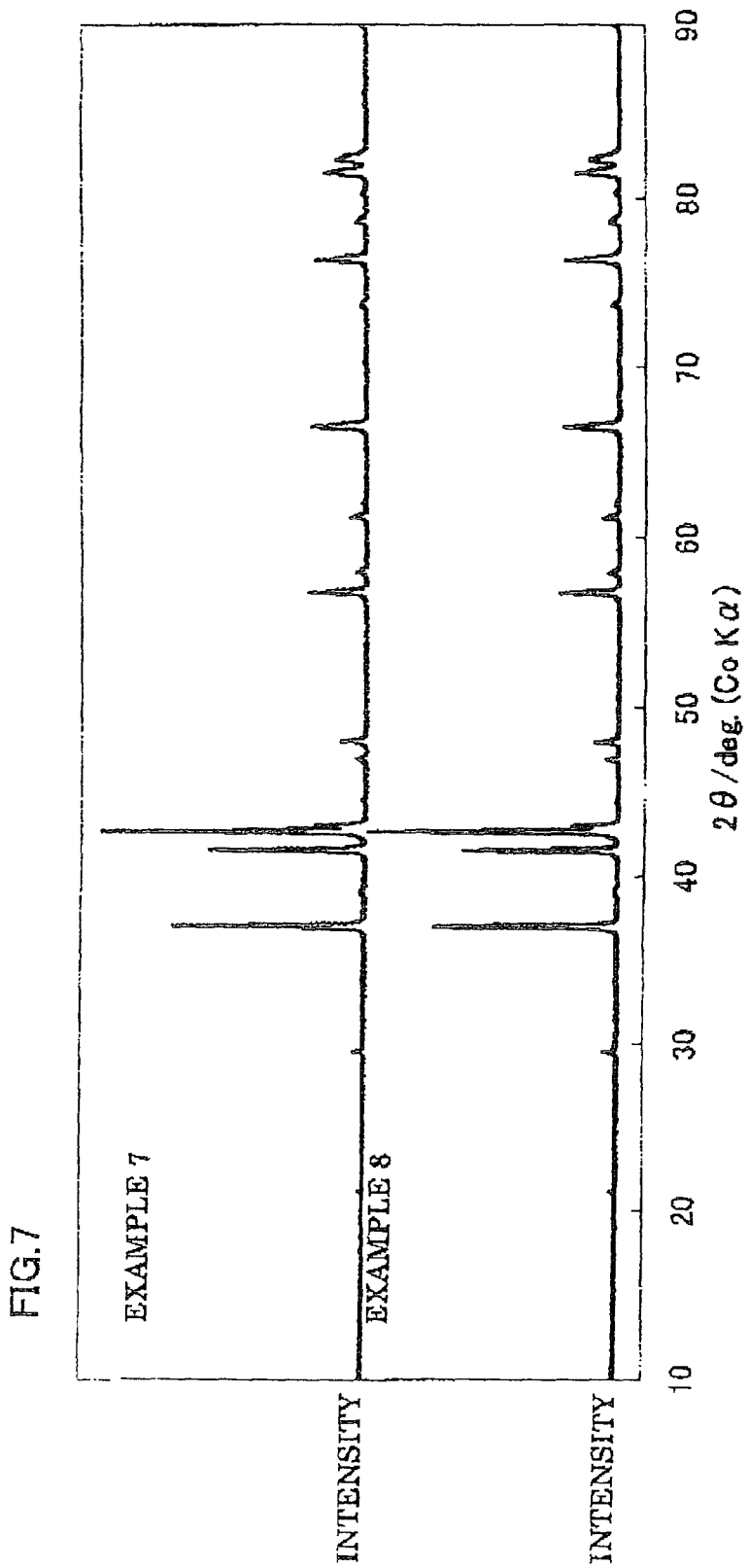
FIG. 7 is the powder X-ray diffraction pattern of the main product phase of the phosphor according to the examples 7 and 8 of the present invention.

First, the commercially available $Ca_3N_2$(2N), AlN(3N), $Si_3N_4$(3N), and $Eu_2O_3$(3N) were prepared. All the raw materials used at this time have the average particle size of 5.0 μm or less. Then, each raw material was weighed, to obtain 0.985/3 mol of $Ca_3N_2$, 1 mol of AlN, 1/3 mol of $Si_3N_4$, and 0.015/2 mol of $Eu_2O_3$. Next, all the raw materials were mixed by using the mortar in the glove box under the nitrogen atmosphere, and the raw materials thus mixed were put in a BN crucible, then in the nitrogen atmosphere of 0.05 MPa pressure, retained and fired at 1500° C. for 6 hours, with nitrogen ventilated therethrough at 5.0 L/min while maintaining the aforementioned 0.05 MPa pressure, and thereafter, the temperature was cooled from 1500° C. to 200° C., to obtain the phosphor sample including the product phase shown by the composition formula $Ca_{0.985}AlSiN_3:Eu_{0.0150}$ was obtained. The particle size of the phosphor sample thus obtained was 5.34 μm, and the specific surface area was 1.01 m$^2$/g. Further, the emission characteristic and the powder characteristic of the phosphor sample are shown in table 1, and the powder X-ray diffraction pattern is shown in FIG. 7.

Example 8

The phosphor sample including the product phase shown by the composition formula $Ca_{0.985}AlSiN_3:Eu_{0.0150}$ was obtained in the same way as the example 7, excepting that the ventilation amount of the nitrogen was set at 10.0 L/min. The particle size was 5.39 μm, and the specific surface area was 0.99 m$^2$/g. The emission characteristic and the powder characteristic of the phosphor sample thus obtained, and other characteristics are shown in table 1, and the powder X-ray diffraction pattern is shown in FIG. 7.

(Study on the Examples 1 to 8)
1.) Control of the Oxygen Concentration in the Sample When the oxygen concentrations in the phosphor samples are compared between the example 1 and the examples 7, 8, the oxygen concentration in the phosphor sample manufactured in the examples 7, 8 is lower than the oxygen concentration in the sample manufactured in the example 1. The reason is considered to be that the oxygen concentration is reduced, when the nitrogen gas is constantly ventilated in the firing furnace during firing the phosphor sample, thereby increasing the ventilation amount to let the oxygen in the raw material and adhered to the crucible is released to the outside the firing furnace at initial period of firing. Further, the reason is considered to be the effect of releasing the oxygen contained in $Eu_2O_3$ or the like to the outside the crystal as a sintering reaction of a phosphor raw material is progressed, and the effect of releasing the oxygen thereafter to the outside the firing furnace is exhibited to prevent the oxygen from recombining with the crystal phase. A proper value of the ventilation amount of the nitrogen gas during firing is considered to change depending on the volume of the firing furnace or the shape of the furnace. However, in any case, preferably the nitrogen gas is ventilated in the furnace at 1.0 L/min or more.

2.) Relation Between the Crystal Lattice and the Emission Characteristic

Next, based on the measurement result of the powder X-ray diffraction of the phosphor sample according to the examples 1 to 4 and 7, the crystal structure analysis of the phosphor sample was performed by using the Rietveld method. A program "RIETAN-2000" was used for a Rietveld analysis, and the crystal structure of $CaAlSiN_3$ described in 39-0747 of the JCPDS card was used for the crystal structure for reference. Further, a half value width B was calculated for a plurality of diffraction peaks of the diffraction pattern obtained by the powder X-ray diffraction measurement of the phosphor according to the present invention, and from the Sheller formula $Dx=0.9\lambda/B \cos \theta$ (here, Dx is the size of the crystallite, λ is the wavelength of the X-ray used for measurement, B is the half value width of the diffraction peak, and θ is the Bragg angle of the diffraction peak), the size of the crystallite of the phosphor sample was averaged and obtained from the diffraction peak in the range from 36.5° to 37.5°, and 41.9° to 42.9°, 56.3° to 57.3°, for the phosphor sample according to the example 1. The result is shown in table 1.

It was found that the phosphor sample according to the example 1 has the orthorhombic crystal structure, and the value of the a-axis was 9.806 Å, the value of the b-axis was 5.653 Å, and the value of the c-axis was 5.066 Å, and a unit volume of the crystal lattice (described as a crystal lattice volume in some cases hereafter.) was 280.82 Å$^3$. Also, it was found that the size of the crystallite (Dx) of the phosphor sample was 90.8 nm, e.g. not less than 50.0 nm.

It was found that the phosphor sample according to the example 2 had the orthorhombic crystal structure, and the value of the a-axis was 9.796 Å, the value of the b-axis was 5.649 Å, the value of the c-axis was 5.062 Å, and the crystal lattice volume was 280.15 Å$^3$. In addition it was found that the size of the crystallite (Dx) was 92.8 nm, e.g. not less than 50.0 nm.

In the same way, the analysis of the phosphor according to the examples 3 and 4 was performed. Then, in regards to the unit lattice of the phosphor of the example 3, it was found that the value of the a-axis as 9.755 Å the value of the b-axis was 5.634 Å, the value of the c-axis was 5.045 Å, the crystal lattice volume was 277.26 Å$^3$, the size of the crystallite (Dx) was 68.5 nm. In regards to the unit lattice of the phosphor of the example 4, it was found that the value of the a-axis was 9.749 Å, the value of the b-axis was 5.599 Å, the value of the c-axis vas 5.030 Å the crystal lattice volume as 274.60 Å$^3$, and the size of the crystallite (Dx) was 76.2 nm.

It was found that the phosphor sample according to the example 7 had the orthorhombic crystal structure, and the value of the a-axis was 9.806 Å, the value of the b-axis was 5.655 Å, the value of the c-axis was 5.067 Å, the crystal lattice volume was 280.99 Å$^3$, and the size of the crystallite (Dx) was 101.9 nm, e.g. not less than 50.0 nm. In the same way, it was found that the phosphor sample according to the example 8 also had the orthorhombic crystal structure, and the value of the a-axis was 9.808 Å, the value of the b-axis was 5.656 Å, the value of the c-axis was 5.068 Å, the crystal lattice volume was 281.14 Å$^3$, and the size of the crystallite (Dx) was 102.6 nm, e.g. not less than 50.0 nm.

From the aforementioned evaluation results, the lattice constant of each crystal lattice of the a-axis, b-axis, and c-axis in the phosphor sample is increased, with the improvement of the emission characteristic of the phosphor sample, and simultaneously, the increase of the crystal lattice volume is observed. Then, the lattice constant is increased and the crystal lattice volume is increased in proportion to the reduction of the amount of the oxygen contained in the phosphor sample, and when the amount of the oxygen in the phosphor sample is reduced, the crystal lattice volume is increased. Details are unknown, regarding the cause of the increase of the crystal lattice volume in association with the reduction of the amount of the oxygen in the phosphor sample. It is considered that the oxygen enters into $CaAlSiN_3$ lattice of the phosphor sample, thereby replacing the nitrogen in the lattice with the oxygen, or the lattice volume of the impurity phase, in which the oxygen is mixed in, is small. Therefore, it is estimated that when the ratio of the impurity phase is increased, the lattice volume is relatively decreased. Accordingly, when the phase has increased lattice constant and lattice volume and a large crystallite, it is estimated that further pure phase having an excellent emission characteristic is generated. From the viewpoint of the emission characteristic, in order to obtain the phosphor having the emission peak wavelength of 650 nm or more, preferably the amount of the oxygen contained as the impurity is 3.0 wt % or less, and the lattice constant of each crystal lattice is a=9.75 Å or more, b=5.64 Å or more, and c=5.05 Å or more, and the volume of the crystal lattice is 275.0 Å³ or more, and further preferably a=9.80 Å or more, b=5.65 Å or more, c=5.06 Å or more, and the volume of the crystal lattice is 280.5 Å³ or more. Incidentally, when compared with the crystal structure of CaAlSiN₃ described in 39-0747 of the JCPDS card, the lattice constant and the volume of the phosphor sample according to this example is more dramatically increased.

Note that the phosphor sample shown in the example 8 exhibits the highest emission characteristic.

3.) Regarding the Powder Characteristic

The phosphor powder obtained in the example 1 and the examples 7 and 8 has a smaller average particle size (D50), compared with the phosphor particle obtained in the examples 3 and 4. However, when the particle size is measured by the SEM observation, a primary particle size of the examples 3 and 4 is 3 to 4 μm, which is the same size as seen in the examples 7 and 8. However, a huge particle of more than 20 μm existed at only a partial region, and sintering of the primary particles was also observed. As a result of the measurement of a particle size by a laser diffraction scattering method, it was found that no huge particle existed in the examples 1, 7, and 8, and the particle with significantly uniform diameter was generated.

As described above, when the crystal lattice volume and the size of the crystallite of the crystal contained in the phosphor sample become large, or the amount of the oxygen in the crystal is reduced, the phosphor particle with uniform particle diameter is easily generated after phosphor generation, and preferably particle characteristic and pulverizing characteristic are thereby improved. For example, a preferable result could be obtained, such that the particle of the phosphor sample obtained in the examples 7 and 8 showed 1.0 or less of a coefficient of variation (standard deviation/average size) of a distribution of the particle size after pulverizing, thereby providing a significantly sharp distribution of the particle size.

A absolute density measurement was performed in each phosphor sample, and it was found that the phosphor with excellent emission characteristic showed the value near 3.240 g/cc. For measuring the absolute density, Ultrapycnometer 1000 by QUANTACHROME INC. was used. When the absolute density was measured for the phosphors of the examples 3 and 4 for comparison, it was found that the absolute density had the tendency of reduction from 3.240 g/cc. This is because the impurity phase having a lower absolute density different from CaAlSiN₃:Eu was generated, and as a result, an overall absolute specific gravity is also lightened. As described above, it was found that the absolute density of the phosphor was in the range of 3.240 g/cc±3%, and preferably in the range of 3.240 g/cc±1%.

4.) Regarding Durability

An evaluation of durability of the phosphor was performed for each phosphor sample according to the examples 1 to 4, 7 and 8.

The evaluation method of the durability of the phosphor was performed in such a manner that each sample was subjected to heat treatment 300° C. in an atmospheric air for 30 minutes, and a difference in intensity of the emission spectrum when the phosphor was irradiated with monochromatic light with the wavelength of 460 nm was evaluated, for the sample before the heat treatment and after the heat treatment. Specifically, the relative intensity of the maximum peak in the emission spectrum of the sample before the heat treatment was defined as 100%, and next the relative intensity of the maximum peak in the emission spectrum of the sample after the heat treatment was obtained by percentage, and lowering rate of the relative intensity of the maximum peak accompanying the heat treatment was obtained by the negative value. The evaluation result is shown in table 1. Then, it was found that the durability against the heat treatment was improved as the lattice volume of the crystal contained in the phosphor sample was increased, was improved as the oxygen concentration in the crystal was lowered, and was improved when the absolute density of the sample was closer to 3.240 g/cc. The reason is considered to be that the crystallites in the phosphor sample are more regularly arrayed, thus preventing the invasion of the oxygen in the crystal, whereby the deterioration of the emission characteristic can be suppressed.

Comparative Example 1

Figure 5:
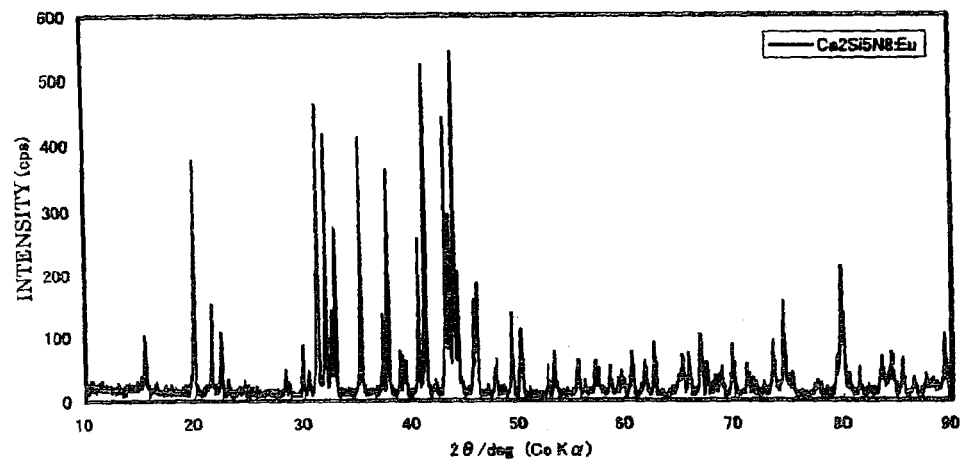
FIG. 5 is the X-ray diffraction pattern of the conventional phosphor according to a comparative example.

$Ca_2Si_5N_8$:Eu phosphor was prepared based on the aforementioned patent documents 4 and 5, and the X-ray diffraction pattern was measured. The measurement result is shown in FIG. 5. Then, the X-ray diffraction peak obtained in FIG. 5 and the structure analysis result in the document described in the patent document 4 (Schlieper and Schlick: Nitridosilicate I, Hochtemperatursynthese and Kristallstruktur von Ca2Si5N8, Z. anorg. allg. Che. 621, (1995), p. 1037) were compared. As a result, it was confirmed that the aforementioned phosphor was the $Ca_2Si_5N_8$:Eu phosphor described in the patent documents 4 and 5. The crystal system of the phosphor is a monoclinic system, however is completely different in structure from the phosphor according to the present invention.

Comparative Example 2

An α-sialon phosphor was prepared based on the aforementioned patent document 3, and the X-ray diffraction pattern was measured. Here, the α-sialon is oxide nitride ceramics with intermediate composition of nitride and oxide, composed of 4 elements such as silicon, aluminum, oxygen, and nitrogen, and Al is substituted for the Si position, and O is substituted for the N position of α-$Si_3N_4$, to form a solid solution, having a framework comprising a tetrahedron structure of (Si, Al) (O, N), and further having the structure wherein metal M (M:Mg, Ca, and lantanide metal except Y, La, and Ce, satisfying $0<x\leq2$) can be dissolved differently from β-sialon. As a result, the X-ray diffraction peak of the α-sialon phosphor shows the diffraction pattern similar to that of the X-ray diffraction peak of the α-$Si_3N_4$. The measurement result is shown in FIG. 6.

Figure 6:
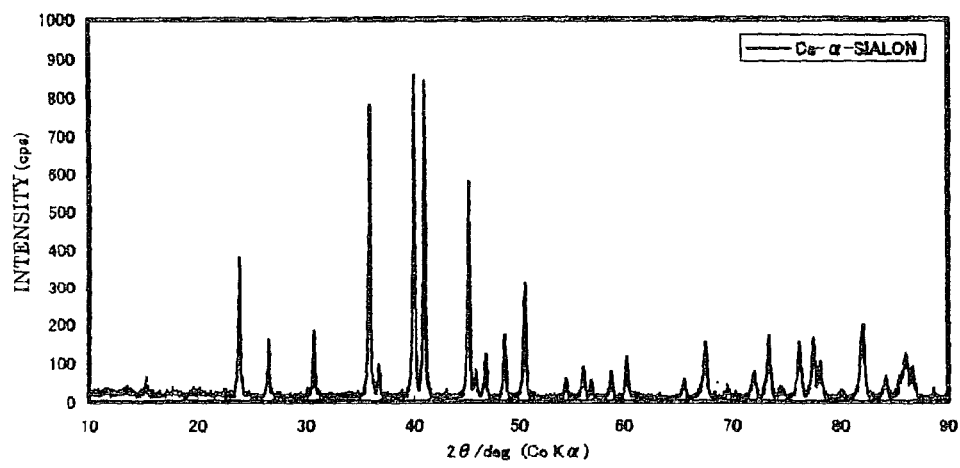
FIG. 6 is the X-ray diffraction pattern of the conventional phosphor according to a comparative example.

The X-ray diffraction peak shown in FIG. 6 has a similar pattern to that of the α-$Si_3N_4$. Then, the pattern thus obtained was further compared with the diffraction pattern of the sialon reported in the JCPDS. As a result, the X-ray diffraction peaks of both patterns coincide with each other, and it was confirmed that the phosphor according to the conventional art shown in FIG. 6 was the α-sialon phosphor described in the patent document 3. In addition, the crystal system of the α-sialon was a hexagonal system, which was a completely different structure from the phosphor according to the present invention.

Comparative Example 3

In the same way as the example 7 excepting that the ventilation of the nitrogen in the firing furnace was stopped, the phosphor sample containing the product phase expressed by the composition formula $Ca_{0.985}AlSiN_3$:$Eu_{0.0150}$ was manufactured. The emission characteristic, the powder characteristic, and other characteristics of the phosphor sample thus obtained are shown in table 1. Then, in the same way as the examples 1 to 8, the crystal structure analysis of the phosphor was performed. As a result, it was found that the unit lattice of the phosphor according to the comparative example 3 was that the a-axis was 9.790 Å, the b-axis was 5.641 Å, the c-axis was 5.058 Å, the crystal lattice volume was 279.3 Å3, and the size (Dx) of the crystallite was 87.6 nm.

Further, it was found that the emission intensity of the phosphor sample according to the comparative example 3 was almost 20% lower than that of the phosphor sample according to the example 7. In addition, it was found that the durability against the heat treatment was deteriorated. This is because by stopping the ventilation of the nitrogen in the firing furnace, the oxygen during firing was not sufficiently removed, and the amount of the oxygen was increased in a generated product, whereby both of the crystal lattice volume and the size of the crystallite were reduced.

What is claimed is:

1. A phosphor comprising:
   a product phase expressed by a composition formula MADOoNn:Z, where element M is at least one or more kind of element having bivalent valency, element A is at least one or more kind of element having tervalent valency, element D is at least one or more kind of element selected from the elements having tetravalent valency, 0 is oxygen, N is nitrogen, and element Z is at least one more kind of element selected from rare earth elements or transitional metal elements satisfying $n=3-2/30$, $0+n>8/3$, and
   showing a diffraction peak with relative intensity of 10% or more in the Bragg angle ($2\theta$) range from 36.5° to 37.5° and from 41.9° to 42.9° of the X-ray diffraction pattern, when the relative intensity of the diffraction peak having a highest intensity in a powder Xray diffraction pattern by $CoK_a$ ray is defined as 100%,
   wherein a crystal lattice volume of the product phase is 280.5 Å3 or more, and an oxygen content in the phosphor is more than 0 and 2.2 wt % or less.

2. The phosphor according to claim 1, wherein a crystallite size of the product phase is 90 nm or more.

3. The phosphor according to claim 1, wherein
   the element M is one or more kind of element having bivalent valency, indispensably including Ca;
   the element A is one or more kind of element having tervalent valency, indispensably including Al; and
   the element D is one or more kind of element having tetravalent valency, indispensably including Si.

4. A light source manufactured using the phosphor according to claim 1.

5. The phosphor according to claim 1, wherein the crystal lattice volume of the product phase is 281.0 A3 or more, and the oxygen content in the phosphor is more than 0 and 1.9 wt % or less.

6. The phosphor according to claim 1, wherein the crystal lattice volume of the product phase is 281.1 A3 or more, and the oxygen content in the phosphor is more than 0 and 1.8 wt % or less.

7. The phosphor according to claim 1, wherein the crystal lattice volume of the product phase is 280.5 A3 to 281.1 A3, and the oxygen content in the phosphor is 1.8 wt % to 2.2 wt %.

* * * * *